(12) United States Patent
Kotera

(10) Patent No.: US 9,286,229 B2
(45) Date of Patent: Mar. 15, 2016

(54) DEVICE TO CONTROL UPDATING OF CACHE LINE

(71) Applicant: Renesas Electronics Corporation, Kawasaki-shi, Kanagawa (JP)

(72) Inventor: Isao Kotera, Kawasaki (JP)

(73) Assignee: Renesas Electronics Corporation, Kawasaki-shi, Kanagawa (JP)

( * ) Notice: Subject to any disclaimer, the term of this patent is extended or adjusted under 35 U.S.C. 154(b) by 193 days.

(21) Appl. No.: 13/946,844

(22) Filed: Jul. 19, 2013

(65) Prior Publication Data

US 2014/0032847 A1 Jan. 30, 2014

(30) Foreign Application Priority Data

Jul. 26, 2012 (JP) ................................. 2012-165993

(51) Int. Cl.
*G06F 12/12* (2006.01)
*G06F 12/08* (2006.01)

(52) U.S. Cl.
CPC ........ *G06F 12/0875* (2013.01); *G06F 12/0848* (2013.01); *G06F 12/12* (2013.01); *Y02B 60/1225* (2013.01)

(58) Field of Classification Search
CPC .............................. G06F 12/12; G06F 12/0848
USPC .................................................. 711/125, 133
See application file for complete search history.

(56) References Cited

U.S. PATENT DOCUMENTS

| 6,470,425 B1* | 10/2002 | Yamashiroya ................ 711/133 |
| 2009/0182951 A1* | 7/2009 | Matick et al. ................ 711/134 |
| 2009/0210630 A1* | 8/2009 | Dimpsey et al. ............. 711/137 |
| 2012/0159075 A1* | 6/2012 | Luick ........................... 711/122 |

FOREIGN PATENT DOCUMENTS

JP 2000-339222 A 12/2000

* cited by examiner

*Primary Examiner* — Than Nguyen
(74) *Attorney, Agent, or Firm* — McGinn IP Law Group, PLLC

(57) ABSTRACT

A semiconductor device which can hold an instruction configuring a loop in a cache memory is provided. A main memory stores an instruction. A cache memory stores the instruction temporarily. A CPU reads an instruction from the main memory or the cache memory and executes the instruction. The cache control unit stops updating an instruction stored in the cache memory, when the same instruction as the instruction read in the past is again read within a prescribed number of read.

20 Claims, 21 Drawing Sheets

DEVICE TO CONTROL UPDATING OF CACHE LINE

CROSS-REFERENCE TO RELATED APPLICATIONS

The disclosure of Japanese Patent Application No. 2012-165993 filed on Jul. 26, 2012 including the specification, drawings and abstract is incorporated herein by reference in its entirety.

BACKGROUND

The present invention relates to a semiconductor device, as exemplified by a semiconductor device provided with a cache memory.

In recent years, a cache memory is employed in order to improve efficiency of a micro-processor system. A small-capacity instruction cache of a fully associative system is mounted in many cases, from a standpoint of a trade-off between an area and performance.

For example, a cache memory disclosed by Patent Literature 1 (Published Japanese Unexamined Patent Application No. 2000-339222) includes a hit/miss counter circuit (300) which holds the number of continuous occurrences of a cache hit or a cache miss corresponding to each entry, and a write control circuit (400) which controls whether to forbid replacement of an entry of a cache memory. In the write control circuit (400), the number of continuous hits as a condition for forbidding replacement and the number of continuous misses as a condition for canceling the forbidding replacement are set up, and whether the replacement is forbidden or not is controlled based on these conditions.

PATENT LITERATURE (Patent Literature 1) Published Japanese Unexamined Patent Application No. 2000-339222

SUMMARY

By the way, when a loop exists in a program, an instruction which configures the loop is used repeatedly; therefore, it is desirable to hold the instruction in a cache memory without replacing it.

However, in the method of forbidding the replacement according to the number of continuous cache hits as disclosed by Patent Literature 1, it is difficult to hold the instruction which configures a loop, in a cache memory.

The other issues and new features of the present invention will become clear from the description of the present specification and the accompanying drawings.

A semiconductor device according to one embodiment stops updating of an instruction in a cache memory when the same instruction as the instruction read in the past is again read within a prescribed number of read.

According to the semiconductor device according to the embodiment, it is possible to hold an instruction which configures a loop, in a cache memory.

DETAILED DESCRIPTION

Hereinafter, with reference to the accompanying drawings, the embodiments of the present invention are explained in detail.

Embodiment 1

Figure 1:
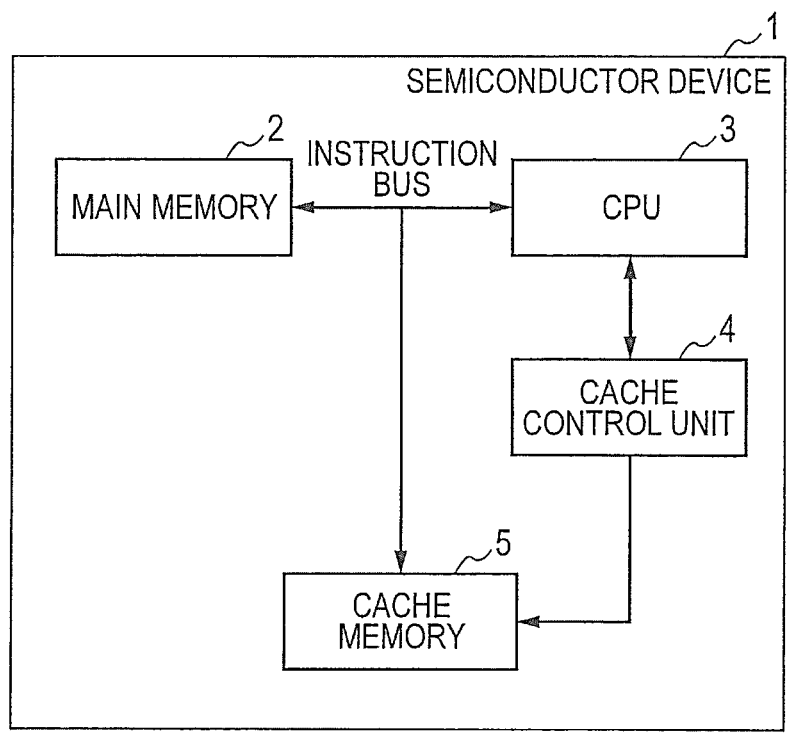
FIG. 1 is a drawing illustrating a configuration of a semiconductor device according to Embodiment 1.

FIG. 1 illustrates a configuration of a semiconductor device 1 according to Embodiment 1.

As illustrated in FIG. 1, the semiconductor device 1 is configured with a CPU 3, a main memory 2, a cache memory 5, and a cache control unit 4.

The main memory 2 stores an instruction. The cache memory stores an instruction temporarily.

The CPU 3 reads an instruction from the main memory 2 or the cache memory 5 and executes the instruction.

The cache control unit 4 stops updating of the cache memory 5, when the same instruction as the instruction read in the past is again read within a prescribed number of read. In the present specification, the stop of updating of the cache memory 5 may be called cache lock.

According to the present embodiment as described above, in the case of executing a program which has a loop, updating of the cache memory 5 is stopped, when the same instruction as the instruction read in the past is again read within a prescribed number of read; therefore, it is possible to hold the instruction which configures a loop, in the cache memory 5.

Consequently, it is possible to prevent necessary data from being pushed out due to the updating of the cache memory 5, leading to an improved hit ratio of the cache memory 5.

Embodiment 2

Figure 2:
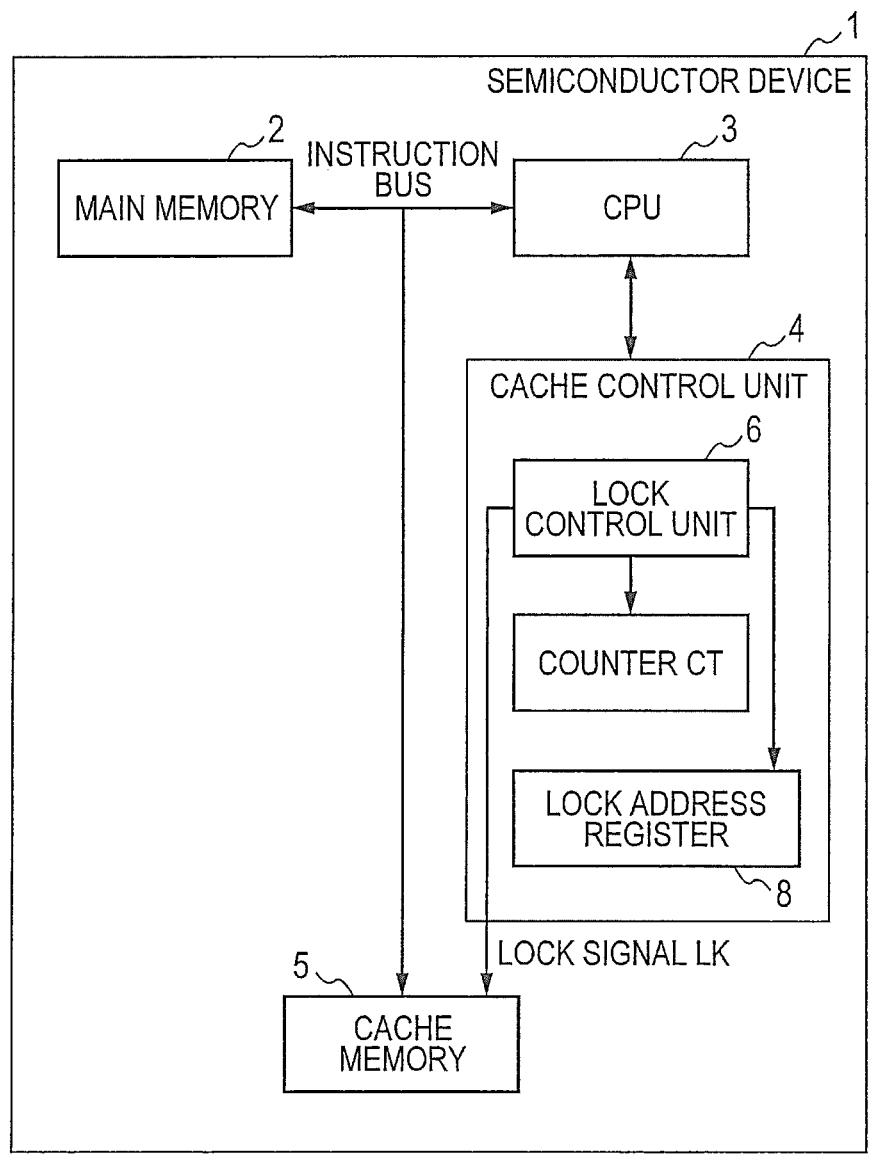
FIG. 2 is a drawing illustrating a configuration of a semiconductor device according to Embodiment 2.

FIG. 2 illustrates a configuration of a semiconductor device according to Embodiment 2.

As illustrated in FIG. 2, the semiconductor device 1 is configured with a CPU 3, a main memory 2, a cache memory 5, and a cache control unit 4.

The main memory 2 stores an instruction. The cache memory 5 is a cache memory of a fully associative system and stores an instruction temporarily.

The CPU 3 reads an instruction from the main memory 2 or the cache memory 5 and executes the instruction.

The cache control unit 4 is configured with a lock control unit 6, a counter CT, and a lock address register 8.

The counter CT counts the number of read of instructions from the main memory 2 or the cache memory 5. The counter CT outputs an overflow signal when the number of read exceeds a prescribed value. The counter CT is initialized when it has overflowed and when the address of the read instruction coincides with a lock address (lock address hit).

The lock address register 8 stores a lock address. The lock control unit 6 increments the counter CT every time when an instruction is read from the main memory 2 or the cache memory 5.

The lock control unit 6 controls the lock address register 8 so as to hold as a lock address the address of an instruction which is read from the main memory 2 due to a cache miss and written in the cache memory 5 in lieu of an instruction having been held in the cache memory 5.

The lock control unit 6 controls the level of a lock signal LK on the basis of the comparison between the address of the instruction which has been read and the lock address which is held in the lock address register 8, and on the basis of the overflow signal from the counter CT. When the lock signal LK is set to an "H" level, the updating of the cache memory 5 is stopped (locked) The lock signal LK is activated to an "H" level when a lock address hit occurs. When the lock signal LK is activated, the updating of an instruction in the cache memory 5 is suppressed even when a cache miss occurs. The lock signal LK is deactivated when the counter CT overflows in the state where the lock signal LK is activated.

When the value of the counter CT is not greater than a prescribed value (the overflow signal is not outputted) and when the address of an instruction read from the main memory 2 or the cache memory 5 coincides with the lock address held in the lock address register 8, the lock control unit 6 activates the lock signal LK to an "H" level, in order to stop the updating of an instruction in the cache memory 5.

When the value of the counter CT exceeds the prescribed value, the lock control unit 6 updates the data (lock address) in the lock address register 8 by use of the address of an instruction read from the main memory 2 or the cache memory 5, and resets the counter CT to an initial value 0.

The lock control unit 6 resets the counter CT to an initial value, when the updating of the cache memory 5 is stopped. The lock control unit 6 increments the counter CT whenever an instruction is read from the main memory 2 or the cache memory 5 after the updating is stopped. The lock control unit 6 resets the counter CT to an initial value, when the address of the instruction read from the main memory 2 or the cache memory 5 coincides with the lock address held in the lock address register 8. When the value of the counter CT exceeds the prescribed value, the lock control unit 6 deactivates the lock signal LK to an "L" level, in order to cancel the stop of updating of the cache memory 5.

(Operation in Related Art which does not Perform Cache Lock Control)

Figure 3:
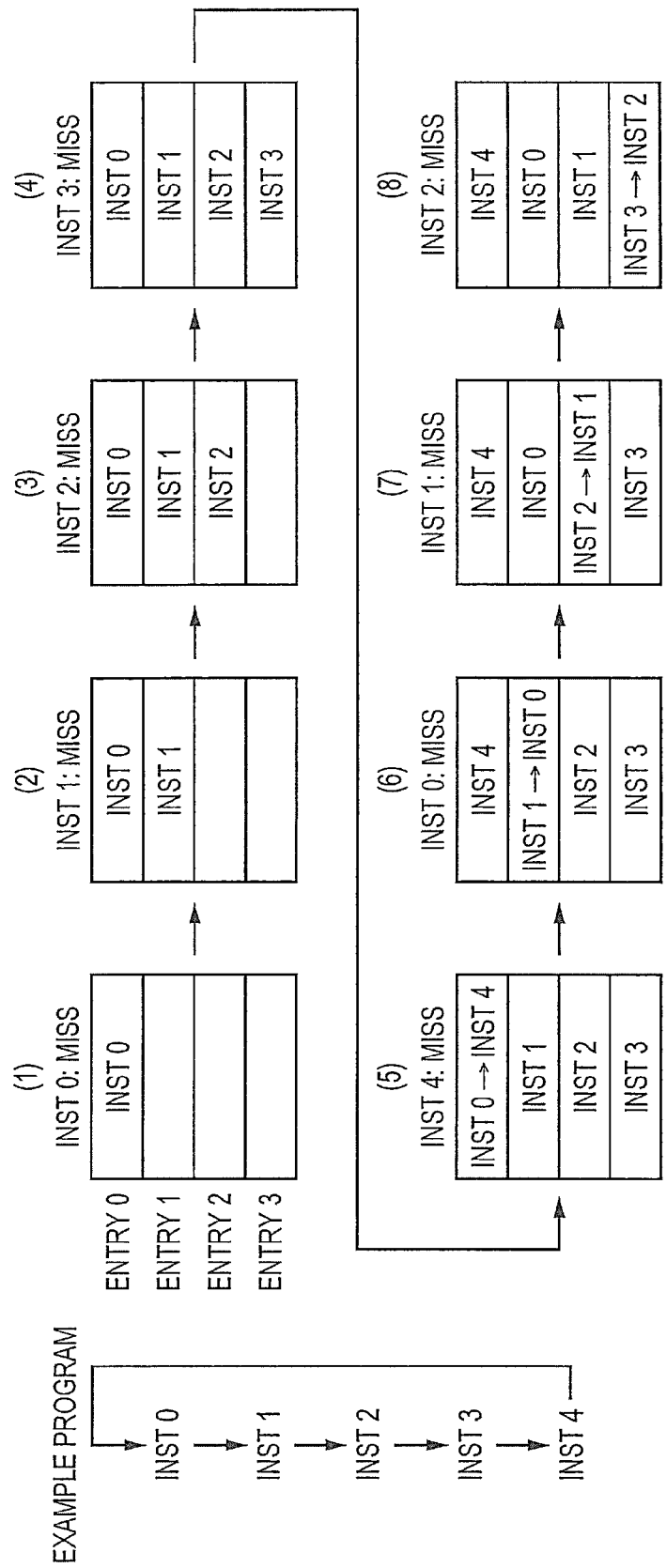
FIG. 3 is a drawing for explaining operation in related art which does not perform cache lock control.

FIG. 3 explains operation in related art which does not perform cache lock control.

FIG. 3 illustrates a fully associative cache memory with the number of entry of 4.

A loop is comprised of five instructions of an instruction 0 through an instruction 4. At a first step, the instruction 0 is registered to an entry 0 of the cache memory since a cache miss occurs to the instruction 0. At a second step, the instruction 1 is registered to an entry 1 of the cache memory since a cache miss occurs to the instruction 1. At a third step, the instruction 2 is registered to an entry 2 of the cache memory since a cache miss occurs to the instruction 2. At a fourth step, the instruction 3 is registered to an entry 3 of the cache memory since a cache miss occurs to the instruction 3. At a fifth step, the instruction 4 is registered to the entry 0 of the cache memory since a cache miss occurs to the instruction 4. At a sixth step, the instruction 0 is registered to the entry 1 of the cache memory since a cache miss occurs to the instruction 0. At a seventh step, the instruction 1 is registered to the entry 2 of the cache memory since a cache miss occurs to the instruction 1. At an eighth step, the instruction 2 is registered to the entry 3 of the cache memory since a cache miss occurs to the instruction 2.

In this way, although a cache memory is provided, when executing a program with a loop having instructions of the number exceeding the number of entry of the cache memory, there arises an issue that the instructions cannot be held properly in the cache memory.

(Operation of the Cache Lock Control)

Figure 4:
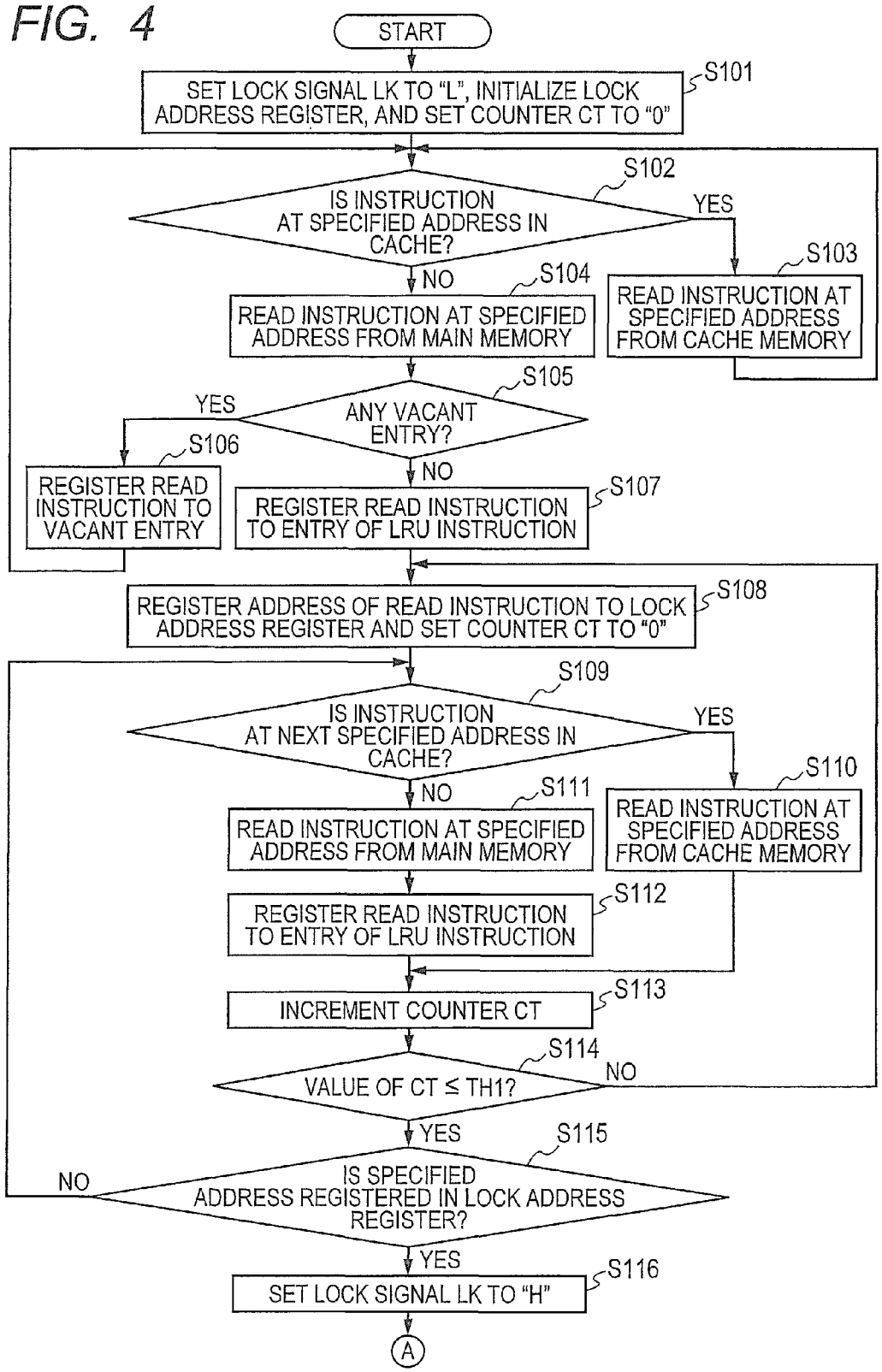
FIG. 4 is a flow chart illustrating the procedure of the cache lock control according to Embodiment 2.
Figure 5:
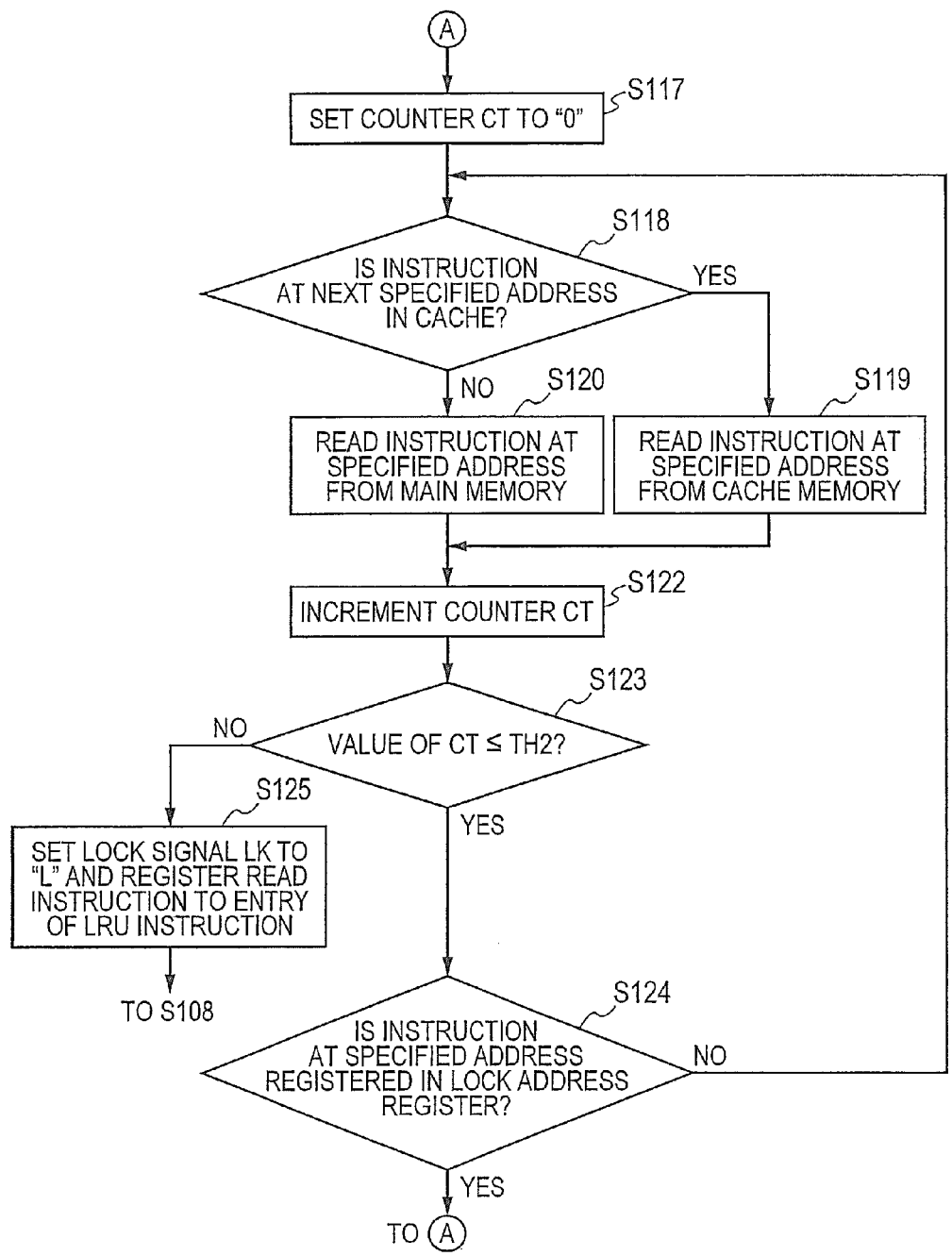
FIG. 5 is a flow chart illustrating the procedure of the cache lock control according to Embodiment 2.

FIGS. 4 and 5 are flow charts illustrating the procedure of the cache lock control according to Embodiment 2.

The lock control unit 6 initializes the counter CT to 0, deactivates the lock signal LK to an "L" level, and initializes the lock address register 8 (Step S101).

When an instruction at an address specified by the program is registered in the cache memory 5 (cache hit) (YES at Step S102), the CPU 3 reads the instruction at the specified address from the cache memory 5 (Step S103).

When the instruction at the specified address is not registered in the cache memory 5 (cache miss) (NO at Step S102), the CPU 3 reads the instruction at the specified address from the main memory 2 (Step S104).

Furthermore, when the cache memory 5 has a vacant entry (YES at Step S105), the CPU 3 registers the read instruction to the vacant entry (Step S106).

On the other hand, when the cache memory 5 has no vacant entry (NO at Step S105), the CPU 3 registers the read instruction to an entry of a least recently used instruction (Step S107).

Furthermore, the lock control unit 6 registers to the lock address register 8 the address of the instruction which has been read from the main memory 2 due to a cache miss and has been written in lieu of the least recently used instruction. The lock control unit 6 initializes the value of the counter CT to 0 (Step S108).

Next, when an instruction at an address specified subsequently by the program is registered in the cache memory 5 (cache hit) (YES at Step S109), the CPU 3 reads the instruction at the specified address from the cache memory 5 (Step S110).

When the instruction at the specified address is not registered in the cache memory 5 (cache miss) (NO at Step S109), the CPU 3 reads the instruction at the specified address from the main memory 2 (Step S111). Furthermore, the CPU 3 registers the read instruction to the entry of the least recently used instruction (Step S112).

The lock control unit 6 increments the counter CT (Step S113). When the value of the counter CT is greater than a reference value (threshold) TH1 (NO at Step S114), the lock control unit 6 controls the procedure so that the processing from Step S108 is repeated.

When the value of the counter CT is not greater than the threshold TH1 (YES at Step S114) and when the specified address is not registered in the lock address register 8 (NO at Step S115), the lock control unit 6 controls the procedure so that the processing from Step S109 is repeated.

When the value of the counter CT is not greater than the threshold TH1 (YES at Step S114) and when the specified address is registered in the lock address register 8 (YES at Step S115), the lock control unit 6 activates the lock signal LK to an "H" level (Step S116), and initializes the value of the counter CT to 0 (Step S117).

Next, when an instruction at an address specified subsequently by the program is registered in the cache memory 5 (cache hit) (YES at Step S118), the CPU 3 reads the instruction at the specified address from the cache memory 5 (Step S119).

When the instruction at the specified address is not registered in the cache memory 5 (cache miss) (NO at Step S118), the CPU 3 reads the instruction at the specified address from the main memory 2 (Step S120).

The lock control unit 6 increments the counter CT (Step S122). When the value of the counter CT is not greater than a reference value (threshold) TH2 (YES at Step S123) and when the specified address is not registered in the lock address register 8 (NO at Step S124), the lock control unit 6 controls the procedure so that the processing from Step S118 is repeated.

When the value of the counter CT is not greater than the threshold TH2 (YES at Step S123) and when the specified address is registered in the lock address register 8 (YES at Step S124), the lock control unit 6 controls the procedure so that the processing from Step S117 is repeated.

When the value of the counter CT is greater than the threshold TH2 (NO at Step S123), the lock control unit 6 deactivates the lock signal LK to an "L" level, and the CPU 3 registers the read instruction to the entry of the least recently used instruction (Step S125). Furthermore, the lock control unit 6 controls the procedure so that the processing from Step S108 is repeated.

(Example of Operation)

Figure 6:
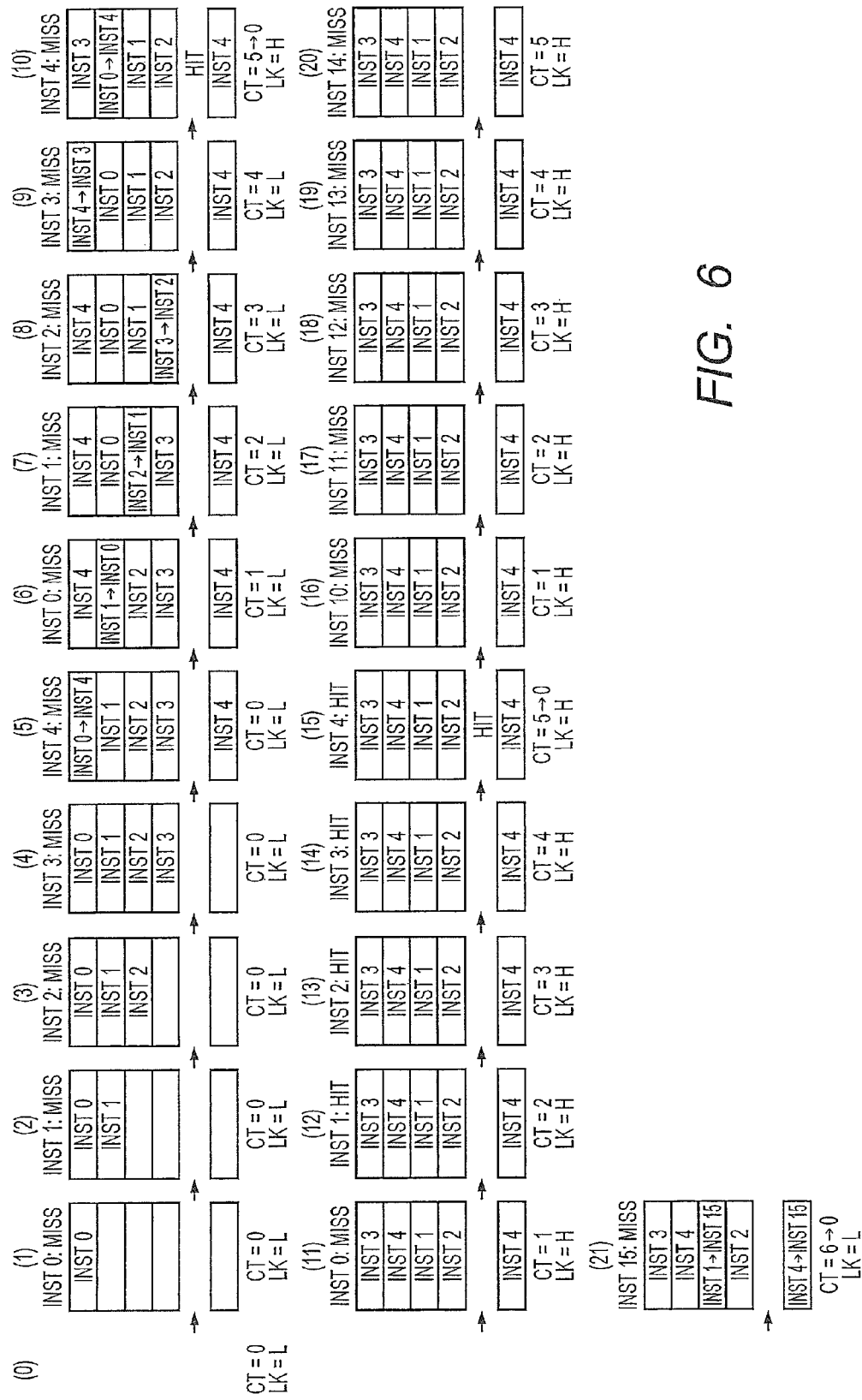
FIG. 6 is a drawing for explaining an example of operation according to Embodiment 2.

FIG. 6 explains an example of operation according to Embodiment 2. As is the case with FIG. 3, in FIG. 6, the cache memory 5 is a fully associative cache memory with the number of entry of 4, and a loop is comprised of five instructions of an instruction 0 through an instruction 4.

At Step (0), the lock control unit 6 initializes the counter CT to 0, deactivates the lock signal LK to an "L" level, and initializes the lock address register 8.

At Step (1), the instruction 0 is not registered in the cache memory 5 (cache miss), therefore, the CPU 3 reads the instruction 0 from the main memory 2 and registers it to the cache memory 5.

At Step (2), the instruction 1 is not registered in the cache memory 5 (cache miss), therefore, the CPU 3 reads the instruction 1 from the main memory 2 and registers it to the cache memory 5.

At Step (3), the instruction 2 is not registered in the cache memory 5 (cache miss), therefore, the CPU 3 reads the instruction 2 from the main memory 2 and registers it to the cache memory 5.

At Step (4), the instruction 3 is not registered in the cache memory 5 (cache miss), therefore, the CPU 3 reads the instruction 3 from the main memory 2 and registers it to the cache memory 5.

At Step (5), the instruction 4 is not registered in the cache memory 5 (cache miss), therefore, the CPU 3 reads the instruction 4 from the main memory 2 and registers the instruction 4 to the cache memory 5 in lieu of the least recently used instruction 0. The lock control unit 6 registers to the lock address register 8 the address of the instruction 4 registered to the cache memory 5 as a lock address, and initializes the value of the counter CT to 0.

At Step (6), the instruction 0 is not registered in the cache memory 5 (cache miss), therefore, the CPU 3 reads the instruction 0 from the main memory 2 and registers the instruction 0 to the cache memory 5 in lieu of the least recently used instruction 1. The lock control unit 6 increments the counter CT to 1. The value 1 of the counter CT is not greater than the threshold TH1 (=5), and the instruction 0 read from the main memory 2 is different from the instruction 4 of which the address (lock address) is stored in the lock address register 8. Therefore, the lock control unit 6 maintains the lock signal LK, the value of the counter CT, and the stored address in the lock address register 8.

At Step (7), the instruction 1 is not registered in the cache memory 5 (cache miss), therefore, the CPU 3 reads the instruction 1 from the main memory 2 and registers the instruction 1 to the cache memory 5 in lieu of the least recently used instruction 2. The lock control unit 6 increments the counter CT to 2. The value 2 of the counter CT is not greater than the threshold TH1 (=5), and the instruction 1 read from the main memory 2 is different from the instruction 4 of which the address (lock address) is stored in the lock address register 8. Therefore, the lock control unit 6 maintains the lock signal LK, the value of the counter CT, and the stored address in the lock address register 8.

At Step (8), the instruction 2 is not registered in the cache memory 5 (cache miss), therefore, the CPU 3 reads the instruction 2 from the main memory 2 and registers the instruction 2 to the cache memory 5 in lieu of the least recently used instruction 3. The lock control unit 6 increments the counter CT to 3. The value 3 of the counter CT is not greater than the threshold TH1 (=5), and the instruction 2 read from the main memory 2 is different from the instruction 4 of which the address (lock address) is stored in the lock address register 8. Therefore, the lock control unit 6 maintains the lock signal LK, the value of the counter CT, and the stored address in the lock address register 8.

At Step (9), the instruction 3 is not registered in the cache memory 5 (cache miss), therefore, the CPU 3 reads the instruction 3 from the main memory 2 and registers the instruction 3 to the cache memory 5 in lieu of the least recently used instruction 4. The lock control unit 6 increments the counter CT to 4. The value 4 of the counter CT is not greater than the threshold TH1 (=5), and the instruction 3 read from the main memory 2 is different from the instruction 4 of which the address (lock address) is stored in the lock address register 8. Therefore, the lock control unit 6 maintains the lock signal LK, the value of the counter CT, and the stored address in the lock address register 8.

At Step (10), the instruction 4 is not registered in the cache memory 5 (cache miss), therefore, the CPU 3 reads the instruction 4 from the main memory 2 and registers the instruction 4 to the cache memory 5 in lieu of the least recently used instruction 0. The lock control unit 6 increments the counter CT to 5. The value 5 of the counter CT is not greater than the threshold TH1 (=5), and the instruction 4 read from the main memory 2 coincides with the instruction 4 of which the address (lock address) is stored in the lock address register 8. Therefore, the lock control unit 6 activates the lock signal LK to an "H" level, and initializes the value of the counter CT to 0.

At Step (11), the instruction 0 is not registered in the cache memory 5 (cache miss), therefore, the CPU 3 reads the instruction 0 from the main memory 2. The lock signal LK is activated to an "H" level, therefore, the CPU 3 does not update the cache memory 5. The lock control unit 6 increments the counter CT to 1. The value 1 of the counter CT is not greater than the threshold TH2 (=5), and the instruction 0 read from the main memory 2 is different from the instruction 4 of which the address (lock address) is stored in the lock address register 8. Therefore, the lock control unit 6 maintains the lock signal LK, the value of the counter CT, and the stored address in the lock address register 8.

At Step (12), the instruction 1 is registered in the cache memory 5 (cache hit), therefore, the CPU 3 reads the instruction 1 from the cache memory 5. The lock control unit 6 increments the counter CT to 2. The value 2 of the counter CT is not greater than the threshold TH2 (=5), and the instruction 1 read from the cache memory 5 is different from the instruction 4 of which the address (lock address) is stored in the lock address register 8. Therefore, the lock control unit 6 maintains the lock signal LK, the value of the counter CT, and the stored address in the lock address register 8.

At Step (13), the instruction 2 is registered in the cache memory 5 (cache hit), therefore, the CPU 3 reads the instruction 2 from the cache memory 5. The lock control unit 6 increments the counter CT to 3. The value 3 of the counter CT is not greater than the threshold TH2 (=5), and the instruction 2 read from the cache memory 5 is different from the instruction 4 of which the address (lock address) is stored in the lock address register 8. Therefore, the lock control unit 6 maintains the lock signal LK, the value of the counter CT, and the stored address in the lock address register 8.

At Step (14), the instruction 3 is registered in the cache memory 5 (cache hit), therefore, the CPU 3 reads the instruction 3 from the cache memory 5. The lock control unit 6 increments the counter CT to 4. The value 4 of the counter CT is not greater than the threshold TH2 (=5), and the instruction 3 read from the cache memory 5 is different from the instruction 4 of which the address (lock address) is stored in the lock address register 8. Therefore, the lock control unit 6 maintains the lock signal LK, the value of the counter CT, and the stored address in the lock address register 8.

At Step (15), the instruction 4 is registered in the cache Memory 5 (cache hit), therefore, the CPU 3 reads the instruction 4 from the cache memory 5. The lock control unit 6 increments the counter CT to 5. The value 5 of the counter CT is not greater than the threshold TH2 (=5), and the instruction 4 read from the main memory 5 coincides with the instruction 4 of which the address (lock address) is stored in the lock address register 8. Therefore, the lock control unit 6 maintains the lock signal LK and the stored address in the lock address register 8, and initializes the value of the counter CT to 0.

At Step (16), an instruction 10 is not registered in the cache memory 5 (cache miss), therefore, the CPU 3 reads the instruction 10 from the main memory 2. The lock signal LK is activated to an "H" level, therefore, the CPU 3 does not update the cache memory 5. The lock control unit 6 increments the counter CT to 1. The value 1 of the counter CT is not greater than the threshold TH2 (=5), and the instruction 10 read from the main memory 2 is different from the instruction 4 of which the address (lock address) is stored in the lock address register 8. Therefore, the lock control unit 6 maintains the lock signal LK, the value of the counter CT, and the stored address in the lock address register 8.

At Step (17), an instruction 11 is not registered in the cache memory 5 (cache miss), therefore, the CPU 3 reads the instruction 11 from the main memory 2. The lock signal LK is activated to an "H" level, therefore, the CPU 3 does not update the cache memory 5. The lock control unit 6 increments the counter CT to 2. The value 2 of the counter CT is not greater than the threshold TH2 (=5), and the instruction 11 read from the main memory 2 is different from the instruction 4 of which the address (lock address) is stored in the lock address register 8. Therefore, the lock control unit 6 maintains the lock signal LK, the value of the counter CT, and the stored address in the lock address register 8.

At Step (18), an instruction 12 is not registered in the cache memory 5 (cache miss), therefore, the CPU 3 reads the instruction 12 from the main memory 2. The lock signal LK is activated to an "H" level, therefore, the CPU 3 does not update the cache memory 5. The lock control unit 6 increments the counter CT to 3. The value 3 of the counter CT is not greater than the threshold TH2 (=5), and the instruction 12 read from the main memory 2 is different from the instruction 4 of which the address (lock address) is stored in the lock address register 8. Therefore, the lock control unit 6 maintains the lock signal LK, the value of the counter CT, and the stored address in the lock address register 8.

At Step (19), an instruction 13 is not registered in the cache memory 5 (cache miss), therefore, the CPU 3 reads the instruction 13 from the main memory 2. The lock signal LK is activated to an "H" level, therefore, the CPU 3 does not update the cache memory 5. The lock control unit 6 increments the counter CT to 4. The value 4 of the counter CT is not greater than the threshold TH2 (=5), and the instruction 13 read from the main memory 2 is different from the instruction 4 of which the address (lock address) is stored in the lock address register 8. Therefore, the lock control unit 6 maintains the lock signal LK, the value of the counter CT, and the stored address in the lock address register 8.

At Step (20), an instruction 14 is not registered in the cache memory 5 (cache miss), therefore, the CPU 3 reads the instruction 14 from the main memory 2. The lock signal LK is activated to an "H" level, therefore, the CPU 3 does not update the cache memory 5. The lock control unit 6 increments the counter CT to 5. The value 5 of the counter CT is not greater than the threshold TH2 (=5), and the instruction 14 read from the main memory 2 is different from the instruction 4 of which the address (lock address) is stored in the lock address register 8. Therefore, the lock control unit 6 maintains the lock signal LK, the value of the counter CT, and the stored address in the lock address register 8.

At Step (21), an instruction 15 is not registered in the cache memory 5 (cache miss), therefore, the CPU 3 reads the instruction 15 from the main memory 2. The lock control unit 6 increments the counter CT to 6. The value 6 of the counter CT is greater than the threshold TH2 (=5). Therefore, the CPU 3 registers the instruction 15 to the cache memory 5 in lieu of the least recently used instruction 1. The lock control unit 6 registers to the lock address register 8 the address of the instruction 15 which is registered to the cache memory 5, deactivates the lock signal LK to an "L" level, and initializes the value of the counter CT to 0.

As described above, in the present embodiment, when executing a program which has a loop of a size slightly larger than the number of entry of a cache, whether an instruction which configures a loop is read or not is determined by measuring an interval until the instruction registered to the cache memory 5 is read again. When the instruction which configures a loop is read, updating of the cache memory 5 is stopped (locked). Accordingly, a cache hit ratio improves in a program which includes a small loop, and the processing capability of the entire system improves. It is possible to reduce the number of access to the memory because the hit ratio to the cache memory improves, leading to the reduction of the power consumption of the entire system. Also as for the circuit area, from the viewpoint of cost-effectiveness, it is possible to attain the improved efficiency higher than the improved efficiency which can be attained by increasing the number of entry of the cache memory 5.

Embodiment 3

Embodiment 3 is different from Embodiment 2 with respect to the lock control unit 6.

In Embodiment 2, the lock control unit 6 increments the counter CT whenever an instruction is read from the main memory 2 or the cache memory 5 after the stop of updating of the cache memory 5. On the other hand, in Embodiment 3, the lock control unit 6 increments the counter CT for every cache miss after the stop of updating of the cache memory 5.

(Operation of the Cache Lock Control)

Figure 7:
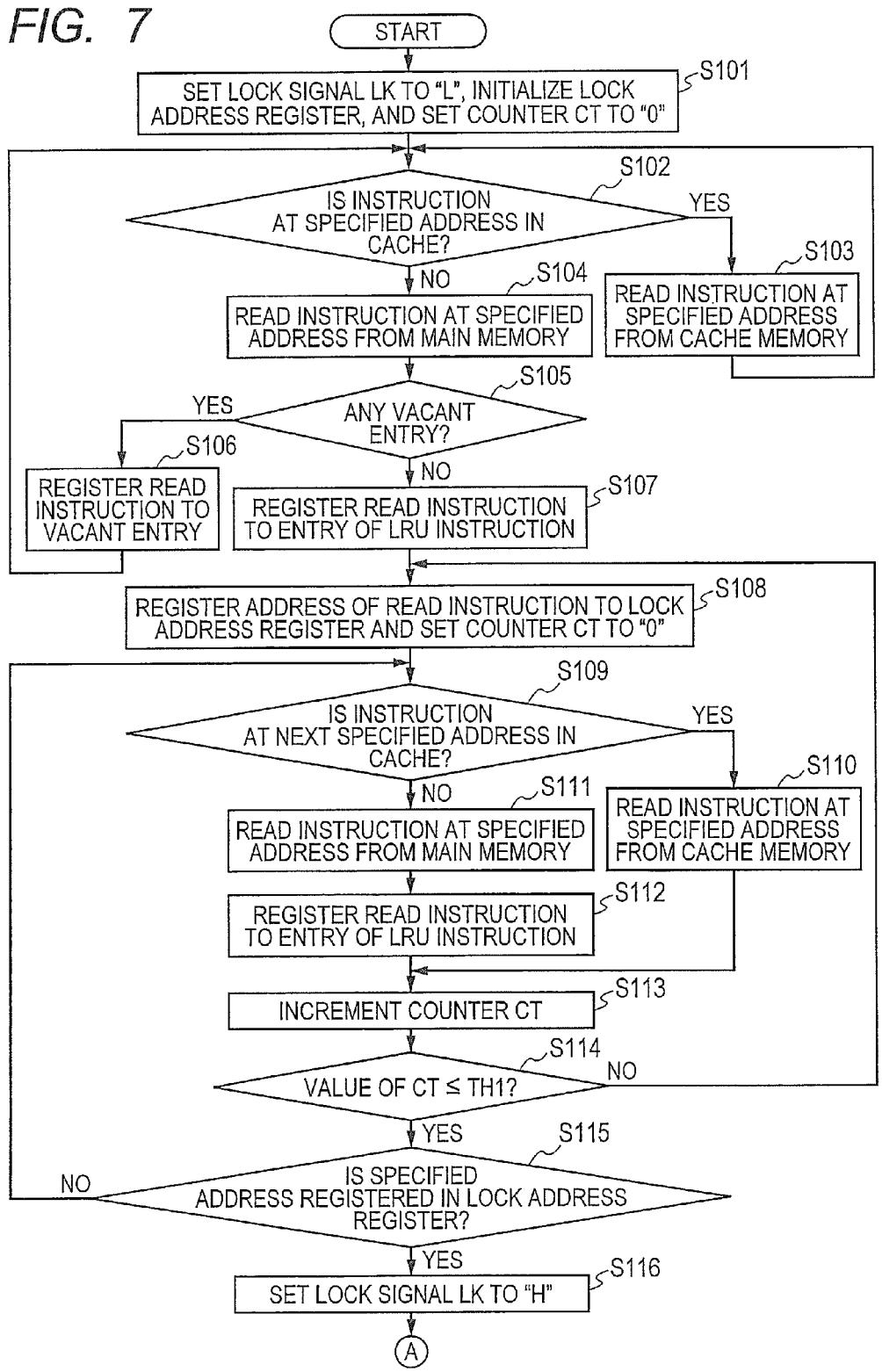
FIG. 7 is a flow chart illustrating the procedure of the cache lock control according to Embodiment 3.
Figure 8:
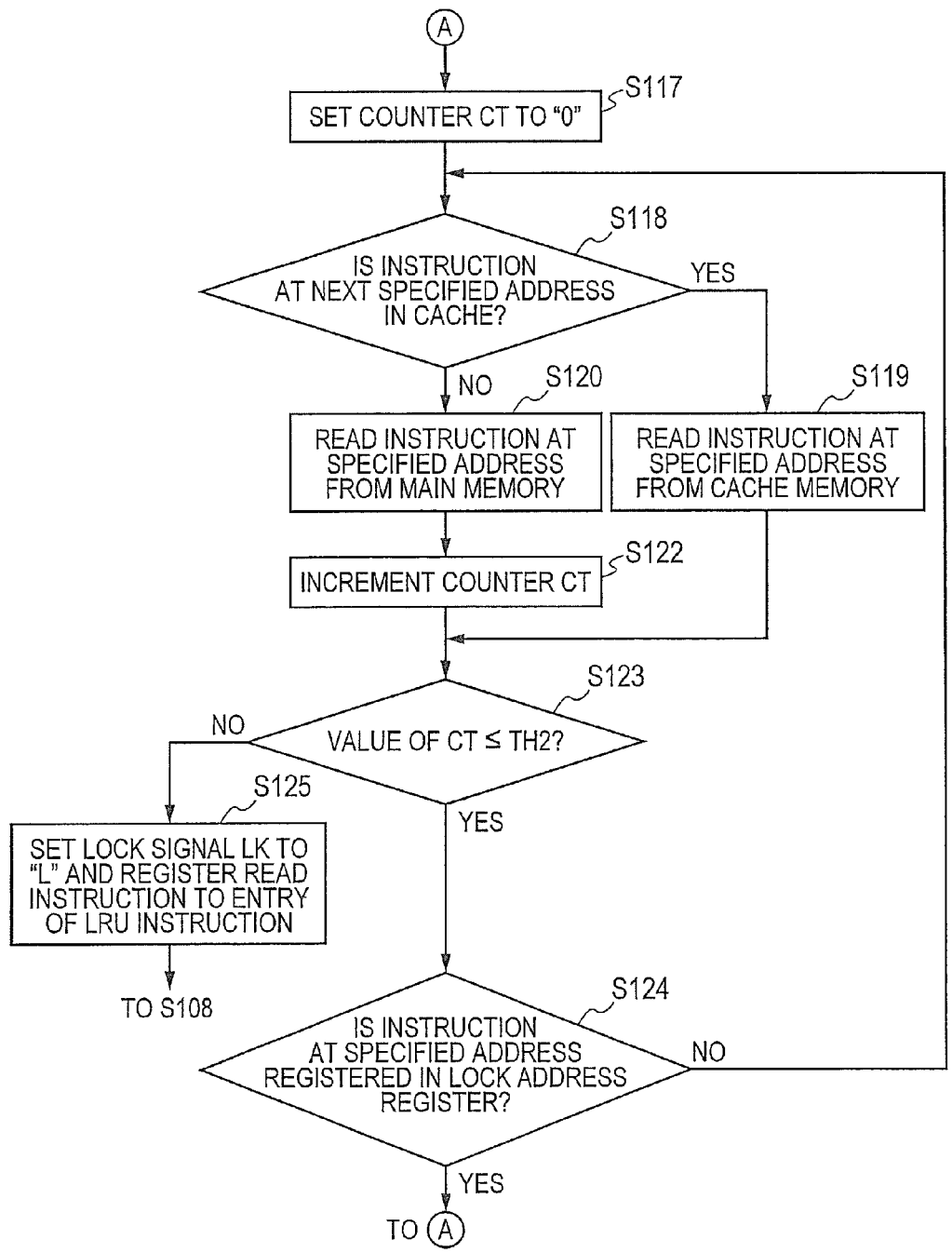
FIG. 8 is a flow chart illustrating the procedure of the cache lock control according to Embodiment 3.

FIGS. 7 and 8 are flow charts illustrating the procedure of the cache lock control according to Embodiment 3.

The flow charts illustrated in FIGS. 7 and 8 are different from the flow charts illustrated in FIGS. 4 and 5 in the following point.

In FIGS. 4 and 5, at Step S118, irrespective of the fact that a cache hit occurs (YES at Step S118) or a cache miss occurs (NO at Step S118), the lock control unit 6 increments the counter CT at Step S122.

On the other hand, in FIGS. 7 and 8, at Step S118, when a cache miss occurs (NO at Step S118), the lock control unit 6 increments the counter CT at Step S122, and when a cache hit occurs (YES at Step S118), the lock control unit 6 does not increment the counter CT.

(Example of Operation)

Figure 9:
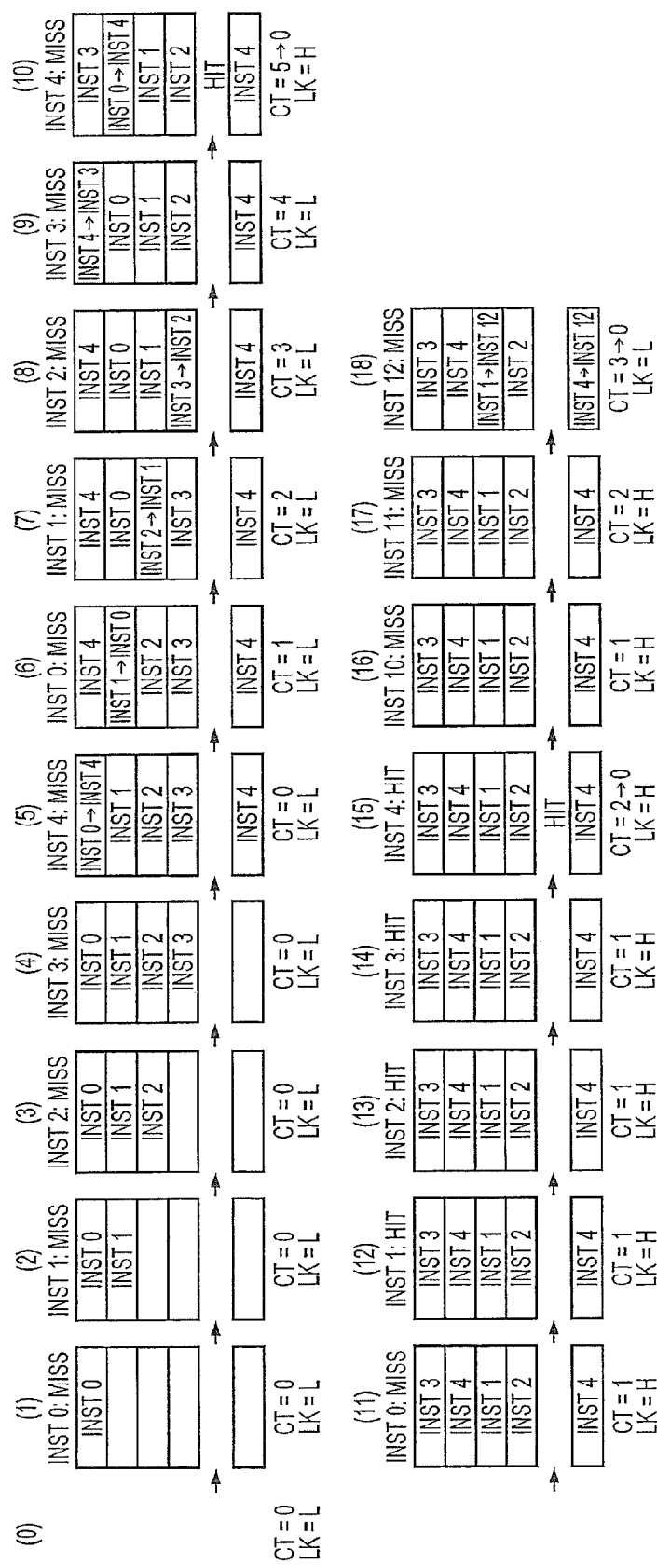
FIG. 9 is a drawing for explaining an example of operation according to Embodiment 3.

FIG. 9 explains an example of operation according to Embodiment 3. As is the case with FIG. 3, in FIG. 9, the cache memory 5 is a fully associative cache memory with the number of entry of 4, and a loop is comprised of five instructions of an instruction 0 through an instruction 4.

At Step (0), the lock control unit 6 initializes the counter CT to 0, deactivates the lock signal LK to an "L" level, and initializes the lock address register 8.

At Step (1), the instruction 0 is not registered in the cache memory 5 (cache miss), therefore, the CPU 3 reads the instruction 0 from the main memory 2 and registers it to the cache memory 5.

At Step (2), the instruction 1 is not registered in the cache memory 5 (cache miss), therefore, the CPU 3 reads the instruction 1 from the main memory 2 and registers it to the cache memory 5.

At Step (3), the instruction 2 is not registered in the cache memory 5 (cache miss), therefore, the CPU 3 reads the instruction 2 from the main memory 2 and registers it to the cache memory 5.

At Step (4), the instruction 3 is not registered in the cache memory 5 (cache miss), therefore, the CPU 3 reads the instruction 3 from the main memory 2 and registers it to the cache memory 5.

At Step (5), the instruction 4 is not registered in the cache memory 5 (cache miss), therefore, the CPU 3 reads the instruction 4 from the main memory 2 and registers the instruction 4 to the cache memory 5 in lieu of the least recently used instruction 0. The lock control unit 6 registers to the lock address register 8 the address of the instruction 4 registered to the cache memory 5 as a lock address, and initializes the value of the counter CT to 0.

At Step (6), the instruction 0 is not registered in the cache memory 5 (cache miss), therefore, the CPU 3 reads the instruction 0 from the main memory 2 and registers the instruction 0 to the cache memory 5 in lieu of the least recently used instruction 1. The lock control unit 6 increments the counter CT to 1. The value 1 of the counter CT is not greater than the threshold TH1 (=5), and the instruction 0 read from the main memory 2 is different from the instruction 4 of which the address (lock address) is stored in the lock address register 8. Therefore, the lock control unit 6 maintains the lock signal LK, the value of the counter CT, and the stored address in the lock address register 8.

At Step (7), the instruction 1 is not registered in the cache memory 5 (cache miss), therefore, the CPU 3 reads the instruction 1 from the main memory 2 and registers the instruction 1 to the cache memory 5 in lieu of the least recently used instruction 2. The lock control unit 6 increments the counter CT to 2. The value 2 of the counter CT is not greater than the threshold TH1 (=5), and the instruction 1 read from the main memory 2 is different from the instruction 4 of which the address (lock address) is stored in the lock address register 8. Therefore, the lock control unit 6 maintains the lock signal LK, the value of the counter CT, and the stored address in the lock address register 8.

At Step (8), the instruction 2 is not registered in the cache memory 5 (cache miss), therefore, the CPU 3 reads the instruction 2 from the main memory 2 and registers the instruction 2 to the cache memory 5 in lieu of the least recently used instruction 3. The lock control unit 6 increments the counter CT to 3. The value 3 of the counter CT is not greater than the threshold TH1 (=5), and the instruction 2 read from the main memory 2 is different from the instruction 4 of which the address (lock address) is stored in the lock address register 8. Therefore, the lock control unit 6 maintains the lock signal LK, the value of the counter CT, and the stored address in the lock address register 8.

At Step (9), the instruction 3 is not registered in the cache memory 5 (cache miss), therefore, the CPU 3 reads the instruction 3 from the main memory 2 and registers the instruction 3 to the cache memory 5 in lieu of the least recently used instruction 4. The lock control unit 6 increments the counter CT to 4. The value 4 of the counter CT is not greater than the threshold TH1 (=5), and the instruction 3 read from the main memory 2 is different from the instruction 4 of which the address (lock address) is stored in the lock address register 8. Therefore, the lock control unit 6 maintains the lock signal LK, the value of the counter CT, and the stored address in the lock address register 8.

At Step (10), the instruction 4 is not registered in the cache memory 5 (cache miss), therefore, the CPU 3 reads the instruction 4 from the main memory 2 and registers the instruction 4 to the cache memory 5 in lieu of the least recently used instruction 0. The lock control unit 6 increments the counter CT to 5. The value 5 of the counter CT is not greater than the threshold TH1 (=5), and the instruction 4 read from the main memory 2 coincides with the instruction 4 of which the address (lock address) is stored in the lock address register 8. Therefore, the lock control unit 6 activates the lock signal LK to an "H" level, and initializes the value of the counter CT to 0.

At Step (11), the instruction 0 is not registered in the cache memory 5 (cache miss), therefore, the CPU 3 reads the instruction 0 from the main memory 2. The lock signal LK is activated to an "H" level, therefore, the CPU 3 does not update the cache memory 5. The lock control unit 6 increments the counter CT to 1 because a cache miss has occurred. The value 1 of the counter CT is not greater than the threshold TH2 (=2), and the instruction 0 read from the main memory 2 is different from the instruction 4 of which the address (lock address) is stored in the lock address register 8. Therefore, the lock control unit 6 maintains the lock signal LK, the value of the counter CT, and the stored address in the lock address register 8.

At Step (12), the instruction 1 is registered in the cache memory 5 (cache hit), therefore, the CPU 3 reads the instruction 1 from the cache memory 5. The lock control unit 6 maintains the counter CT at 1 because a cache hit has occurred. The value 1 of the counter CT is not greater than the threshold TH2 (=2), and the instruction 1 read from the cache memory 5 is different from the instruction 4 of which the address (lock address) is stored in the lock address register 8. Therefore, the lock control unit 6 maintains the lock signal LK, the value of the counter CT, and the stored address in the lock address register 8.

At Step (13), the instruction 2 is registered in the cache memory 5 (cache hit), therefore, the CPU 3 reads the instruction 2 from the cache memory 5. The lock control unit 6 maintains the counter CT at 1 because a cache hit has occurred. The value 1 of the counter CT is not greater than the threshold TH2 (=2), and the instruction 2 read from the cache memory 5 is different from the instruction 4 of which the address (lock address) is stored in the lock address register 8. Therefore, the lock control unit 6 maintains the lock signal LK, the value of the counter CT, and the stored address in the lock address register 8.

At Step (14), the instruction 3 is registered in the cache memory 5 (cache hit), therefore, the CPU 3 reads the instruction 3 from the cache memory 5. The lock control unit 6 maintains the counter CT at 1 because a cache hit has occurred. The value 1 of the counter CT is not greater than the threshold TH2 (=2), and the instruction 3 read from the cache memory 5 is different from the instruction 4 of which the address (lock address) is stored in the lock address register 8. Therefore, the lock control unit 6 maintains the lock signal LK, the value of the counter CT, and the stored address in the lock address register 8.

At Step (15), the instruction 4 is registered in the cache memory 5 (cache hit), therefore, the CPU 3 reads the instruction 4 from the cache memory 5. The lock control unit 6 maintains the counter CT at 1 because a cache hit has occurred. The value 1 of the counter CT is not greater than the threshold TH2 (=2), and the instruction 4 read from the cache memory 5 coincides with the instruction 4 of which the address (lock address) is stored in the lock address register 8. Therefore, the lock control unit 6 maintains the lock signal LK and the stored address in the lock address register 8, and initializes the value of the counter CT to 0.

At Step (16), an instruction 10 is not registered in the cache memory 5 (cache miss), therefore, the CPU 3 reads the instruction 10 from the main memory 2. The lock signal LK is activated to an "H" level, therefore, the CPU 3 does not update the cache memory 5. The lock control unit 6 increments the counter CT to 1 because a cache miss has occurred. The value 1 of the counter CT is not greater than the threshold TH2 (=2), and the instruction 10 read from the main memory 2 is different from the instruction 4 of which the address (lock address) is stored in the lock address register 8. Therefore, the lock control unit 6 maintains the lock signal LK, the value of the counter CT, and the stored address in the lock address register 8.

At Step (17), an instruction 11 is not registered in the cache memory 5 (cache miss), therefore, the CPU 3 reads the instruction 11 from the main memory 2. The lock signal LK is activated to an "H" level, therefore, the CPU 3 does not update the cache memory 5. The lock control unit 6 increments the counter CT to 2 because a cache miss has occurred. The value 2 of the counter CT is not greater than the threshold TH2 (=2), and the instruction 11 read from the main memory 2 is different from the instruction 4 of which the address (lock address) is stored in the lock address register 8. Therefore, the lock control unit 6 maintains the lock signal LK, the value of the counter CT, and the stored address in the lock address register 8.

At Step (18), an instruction 12 is not registered in the cache memory 5 (cache miss), therefore, the CPU 3 reads the instruction 12 from the main memory 2. The lock signal LK is activated to an "H" level, therefore, the CPU 3 does not update the cache memory 5. The lock control unit 6 increments the counter CT to 3 because a cache miss has occurred. The value 3 of the counter CT is greater than the threshold TH2 (=2). Therefore, the lock control unit 6 registers to the lock address register 8 the address of the instruction 12 which is registered to the cache memory 5, deactivates the lock signal LK to an "L" level, and initializes the value of the counter CT to 0. When the lock signal LK is deactivated to an "L" level, the CPU 3 registers the instruction 12 to the cache memory 5 in lieu of the least recently used instruction 1. The lock control unit 6 registers to the lock address register 8 the address of the instruction 12 registered to the cache memory 5, as the lock address.

As described above, according to the present embodiment, as is the case with Embodiment 2, when executing a program which has a loop of a size slightly larger than the number of entry of a cache, whether an instruction which configures a loop is read or not is determined by measuring an interval until the instruction registered to the cache memory 5 is read again. When the instruction which configures a loop is read, updating of the cache memory 5 is stopped (locked).

Embodiment 4

Embodiment 4 is different from Embodiment 2 with respect to the lock control unit 6.

In Embodiment 2, the lock control unit 6 increments the counter CT whenever an instruction is read from the main memory 2 or the cache memory 5 after the stop of updating of the cache memory 5. After the stop of updating of the cache memory 5, the lock control unit 6 resets the counter CT to an initial value, when the address of the instruction read from the main memory 2 or the cache memory 5 coincides with the lock address held in the lock address register 8.

On the other hand, in Embodiment 4, the lock control unit cancels the stop of updating of the cache memory, when the number of continuous cache misses is greater than a prescribed value after the stop of updating of the cache memory. That is, after the stop of updating of the cache memory 5, the lock control unit 6 increments the counter CT for every cache miss and resets the counter CT to an initial value 0 for every cache hit. After the stop of updating of the cache memory 5, the lock control unit 6 does not compare the address of an instruction read from the main memory 2 or the cache memory 5 with the lock address held at the lock address register 8.

(Operation)

Figure 10:
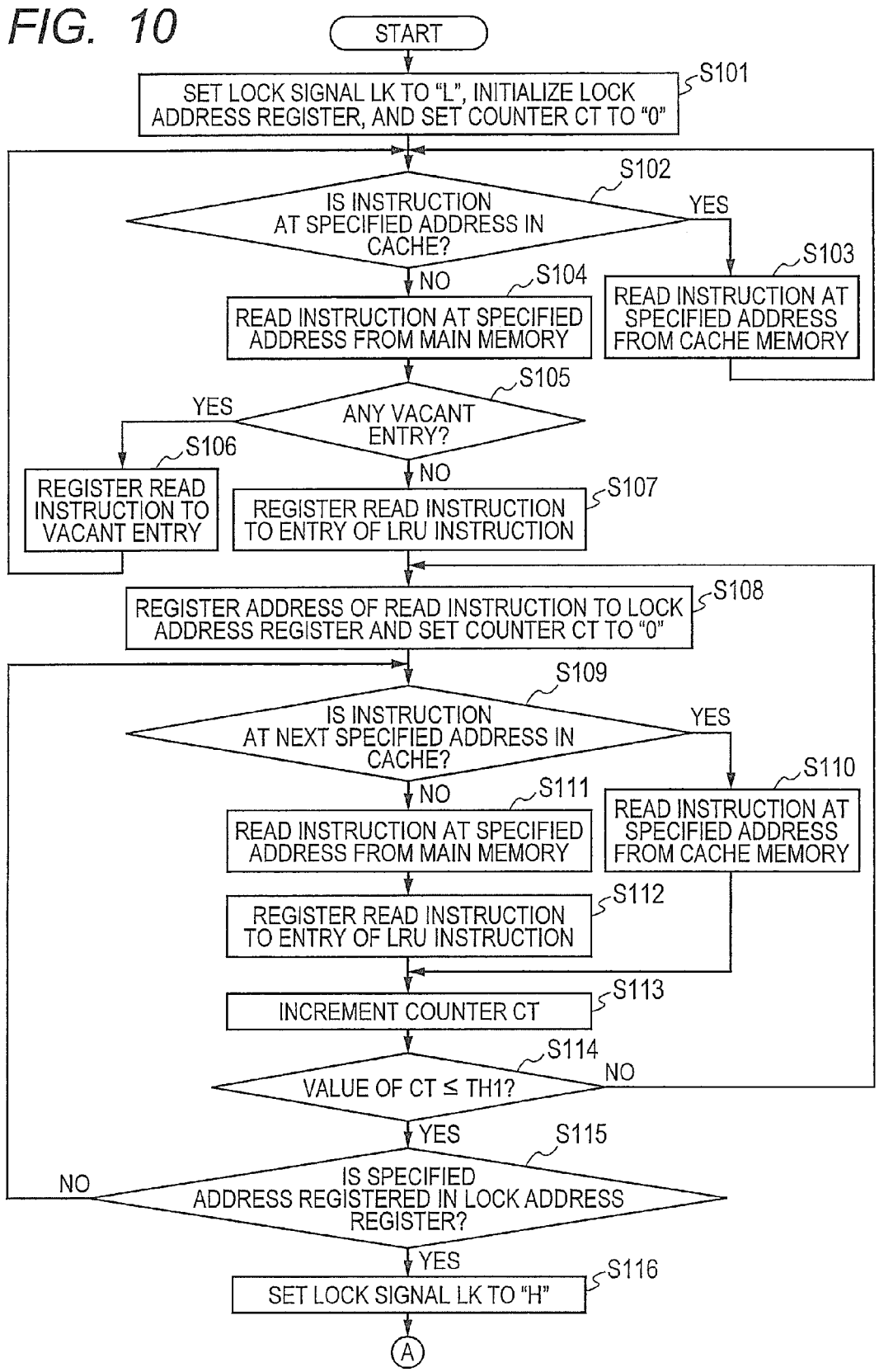
FIG. 10 is a flow chart illustrating the procedure of the cache lock control according to Embodiment 4.
Figure 11:
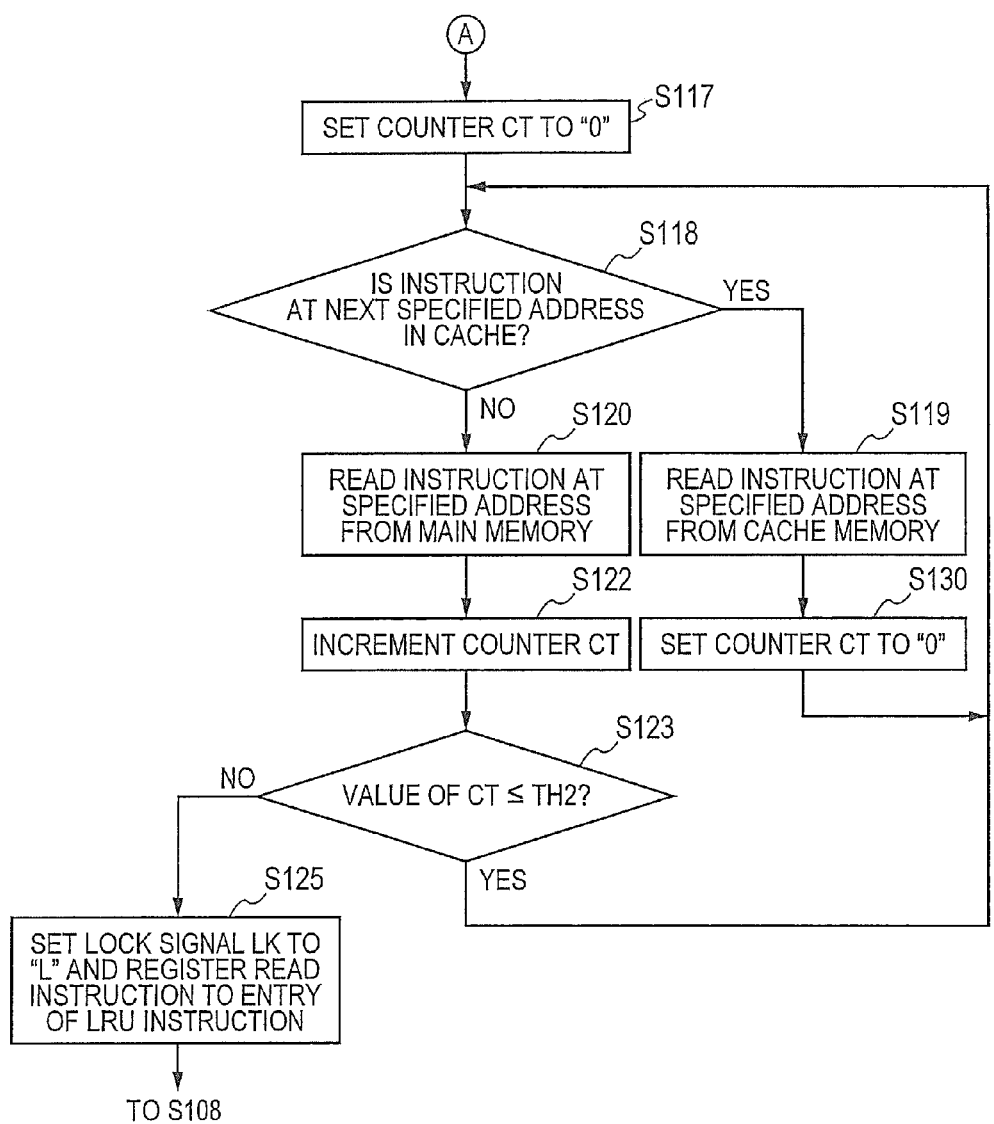
FIG. 11 is a flow chart illustrating the procedure of the cache lock control according to Embodiment 4.

FIGS. 10 and 11 are flow charts illustrating the procedure of the cache lock control according to Embodiment 4.

The flow charts illustrated in FIGS. 10 and 11 is different from the flow charts illustrated in FIGS. 4 and 5 in the following point.

In FIGS. 4 and 5, at Step S118, irrespective of the fact that a cache hit occurs (YES at Step S118) or a cache miss occurs (NO at Step S118), the lock control unit 6 increments the counter CT at Step S122.

On the other hand, in FIGS. 10 and 11, when a cache miss occurs at Step S118 (NO at Step S118), the lock control unit 6 increments the counter CT at Step S122, and when a cache hit occurs at Step S118 (YES at Step S118), the lock control unit 6 initializes the value of the counter CT to 0 at Step S130.

In FIGS. 4 and 5, at Step S123, in cases where the value of the counter CT is not greater than the threshold TH2, when the specified address is not registered in the lock address register 8 (NO at Step S124), the lock control unit 6 controls the procedure so that the processing from Step S118 is repeated, and when the specified address is registered in the lock address register 8 (YES at Step S124), the lock control unit 6 controls the procedure so that the processing from Step S117 is repeated.

On the other hand, in FIGS. 10 and 11, at Step S123, when the value of the counter CT is not greater than the threshold TH2, the lock control unit 6 controls the procedure so that the processing from Step S118 is repeated, without referring to the lock address register 8.

(Example of Operation)

Figure 12:
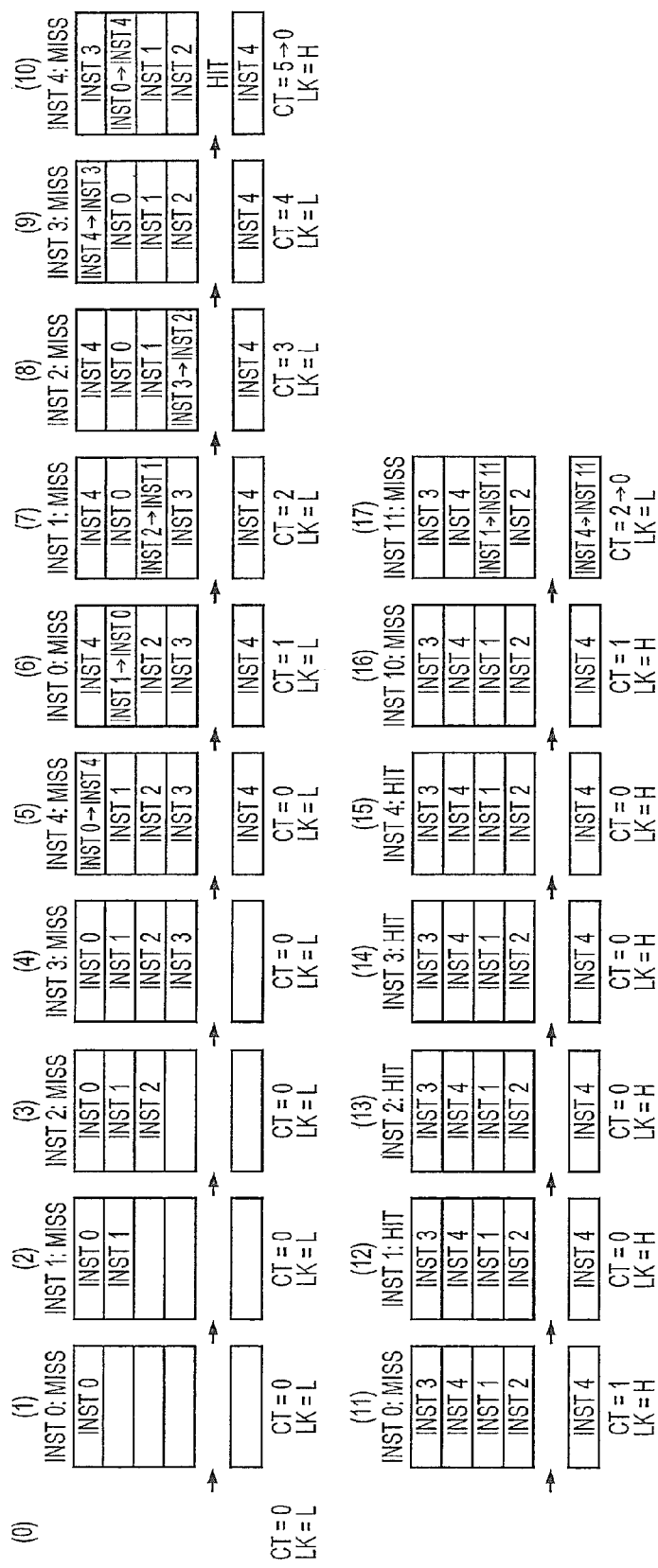
FIG. 12 is a drawing for explaining an example of operation according to Embodiment 4.

FIG. 12 explains an example of operation according to Embodiment 4. As is the case with FIG. 3, in FIG. 12, the cache memory 5 is a fully associative cache memory with the number of entry of 4, and a loop is comprised of five instructions of an instruction 0 through an instruction 4.

At Step (0), the lock control unit 6 initializes the counter CT to 0, deactivates the lock signal LK to an "L" level, and initializes the lock address register 8.

At Step (1), the instruction 0 is not registered in the cache memory 5 (cache miss), therefore, the CPU 3 reads the instruction 0 from the main memory 2 and registers it to the cache memory 5.

At Step (2), the instruction 1 is not registered in the cache memory 5 (cache miss), therefore, the CPU 3 reads the instruction 1 from the main memory 2 and registers it to the cache memory 5.

At Step (3), the instruction 2 is not registered in the cache memory 5 (cache miss), therefore, the CPU 3 reads the instruction 2 from the main memory 2 and registers it to the cache memory 5.

At Step (4), the instruction 3 is not registered in the cache memory 5 (cache miss), therefore, the CPU 3 reads the instruction 3 from the main memory 2 and registers it to the cache memory 5.

At Step (5), the instruction 4 is not registered in the cache memory 5 (cache miss), therefore, the CPU 3 reads the instruction 4 from the main memory 2 and registers the instruction 4 to the cache memory 5 in lieu of the least recently used instruction 0. The lock control unit 6 registers to the lock address register 8 the address of the instruction 4 registered to the cache memory 5 as a lock address, and initializes the value of the counter CT to 0.

At Step (6), the instruction 0 is not registered in the cache memory 5 (cache miss), therefore, the CPU 3 reads the instruction 0 from the main memory 2 and registers the instruction 0 to the cache memory 5 in lieu of the least recently used instruction 1. The lock control unit 6 increments the counter CT to 1. The value 1 of the counter CT is not greater than the threshold TH1 (=5), and the instruction 0 read from the main memory 2 is different from the instruction 4 of which the address (lock address) is stored in the lock address register 8. Therefore, the lock control unit 6 maintains the lock signal LK, the value of the counter CT, and the stored address in the lock address register 8.

At Step (7), the instruction 1 is not registered in the cache memory 5 (cache miss), therefore, the CPU 3 reads the instruction 1 from the main memory 2 and registers the instruction 1 to the cache memory 5 in lieu of the least recently used instruction 2. The lock control unit 6 increments the counter CT to 2. The value 2 of the counter CT is not greater than the threshold TH1 (=5), and the instruction 1 read from the main memory 2 is different from the instruction 4 of which the address (lock address) is stored in the lock address register 8. Therefore, the lock control unit 6 maintains the lock signal LK, the value of the counter CT, and the stored address in the lock address register 8.

At Step (8), the instruction 2 is not registered in the cache memory 5 (cache miss), therefore, the CPU 3 reads the instruction 2 from the main memory 2 and registers the Instruction 2 to the cache memory 5 in lieu of the least recently used instruction 3. The lock control unit 6 increments the counter CT to 3. The value 3 of the counter CT is not greater than the threshold TH1 (=5), and the instruction 2 read from the main memory 2 is different from the instruction 4 of which the address (lock address) is stored in the lock address register 8. Therefore, the lock control unit 6 maintains the lock signal LK, the value of the counter CT, and the stored address in the lock address register 8.

At Step (9), the instruction 3 is not registered in the cache memory 5 (cache miss), therefore, the CPU 3 reads the instruction 3 from the main memory 2 and registers the instruction 3 to the cache memory 5 in lieu of the least recently used instruction 4. The lock control unit 6 increments the counter CT to 4. The value 4 of the counter CT is not greater than the threshold TH1 (=5), and the instruction 3 read from the main memory 2 is different from the instruction 4 of which the address (lock address) is stored in the lock address register 8. Therefore, the lock control unit 6 maintains the lock signal LK, the value of the counter CT, and the stored address in the lock address register 8.

At Step (10), the instruction 4 is not registered in the cache memory 5 (cache miss), therefore, the CPU 3 reads the instruction 4 from the main memory 2 and registers the instruction 3 to the cache memory 5 in lieu of the least recently used instruction 0. The lock control unit 6 increments the counter CT to 5. The value 5 of the counter CT is not greater than the threshold TH1 (=5), and the instruction 4 read from the main memory 2 coincides with the instruction 4 of which the address (lock address) is stored in the lock address register 8. Therefore, the lock control unit 6 activates the lock signal LK to an "H" level, and initializes the value of the counter CT to 0.

At Step (11), the instruction 0 is not registered in the cache memory 5 (cache miss), therefore, the CPU 3 reads the instruction 4 from the main memory 2. The lock signal LK is activated to an "H" level, therefore, the CPU 3 does not update the cache memory 5. The lock control unit 6 increments the counter CT to 1 because a cache miss has occurred. The value 1 of the counter CT is not greater than the threshold TH2 (=1), therefore, the lock control unit 6 maintains the lock signal LK, the value of the counter CT, and the stored address in the lock address register 8.

At Step (12), the instruction 1 is registered in the cache memory 5 (cache hit), therefore, the CPU 3 reads the instruction 1 from the cache memory 5. The lock control unit 6 initializes the counter CT to 0 because a cache hit has occurred. The value 0 of the counter CT is not greater than the threshold TH2 (=1). Therefore, the lock control unit 6 maintains the lock signal LK, the value of the counter CT, and the stored address in the lock address register 8.

At Step (13), the instruction 2 is registered in the cache memory 5 (cache hit), therefore, the CPU 3 reads the instruction 2 from the cache memory 5. The lock control unit 6 initializes the counter CT to 0 because a cache hit has occurred. The value 0 of the counter CT is not greater than the threshold TH2 (=1). Therefore, the lock control unit 6 maintains the lock signal LK, the value of the counter CT, and the stored address in the lock address register 8.

At Step (14), the instruction 3 is registered in the cache memory 5 (cache hit), therefore, the CPU 3 reads the instruction 3 from the cache memory 5. The lock control unit 6 initializes the counter CT to 0 because a cache hit has occurred. The value 0 of the counter CT is not greater than the threshold TH2 (=1). Therefore, the lock control unit 6 maintains the lock signal LK, the value of the counter CT, and the stored address in the lock address register 8.

At Step (15), the instruction 4 is registered in the cache memory 5 (cache hit), therefore, the CPU 3 reads the instruction 4 from the cache memory 5. The lock control unit 6 initializes the counter CT to 0 because a cache hit has occurred. The value 0 of the counter CT is not greater than the threshold TH2 (=1). Therefore, the lock control unit 6 maintains the lock signal LK, the value of the counter CT, and the stored address in the lock address register 8.

At Step (16), an instruction 10 is not registered in the cache memory 5 (cache miss), therefore, the CPU 3 reads the instruction 10 from the main memory 2. The lock signal LK is activated to an "H" level, therefore, the CPU 3 does not update the cache memory 5. The lock control unit 6 increments the counter CT to 1 because a cache miss has occurred. The value 1 of the counter CT is not greater than the threshold TH2 (=1), therefore, the lock control unit 6 maintains the lock signal LK, the value of the counter CT, and the stored address in the lock address register 8.

At Step (17), an instruction 11 is not registered in the cache memory 5 (cache miss), therefore, the CPU 3 reads the instruction 11 from the main memory 2. The lock signal LK is activated to an "H" level, therefore, the CPU 3 does not update the cache memory 5. The lock control unit 6 increments the counter CT to 2 because a cache miss has occurred. The value 2 of the counter CT is greater than the threshold TH2 (=1). Therefore, the lock control unit 6 registers to the lock address register 8 the address of the instruction 11 which is registered to the cache memory 5, deactivates the lock signal LK to an "L" level, and initializes the value of the counter CT to 0. When the lock signal LK is deactivated to an "L" level, the CPU 3 registers the instruction 11 to the cache memory 5 in lieu of the least recently used instruction 1. The lock control unit 6 registers to the lock address register 8 the address of the instruction 11 registered to the cache memory 5, as the lock address.

As described above, according to the present embodiment, as is the case with Embodiment 2, when executing a program which has a loop of a size slightly larger than the number of entry of a cache, whether an instruction which configures a loop is read or not is determined by measuring an interval until the instruction registered to the cache memory 5 is read again. When the instruction which configures a loop is read, updating of the cache memory 5 is stopped (locked).

Embodiment 5

Embodiment 5 is different from Embodiment 2 with respect to an instruction to be registered in the lock address register 8.

That is, in Embodiment 2, the lock control unit 6 controls the lock address register 8 so as to hold the address of an instruction which is read from the main memory 2 due to a cache miss and written in the cache memory 5 in lieu of an instruction held in the cache memory 5.

On the other hand, in Embodiment 5, the lock control unit 6 controls the lock address register 8 so as to hold the address of an instruction deleted from the cache memory 5 in lieu of an instruction read from the main memory 2 due to the cache miss.

(Operation)

Figure 13:
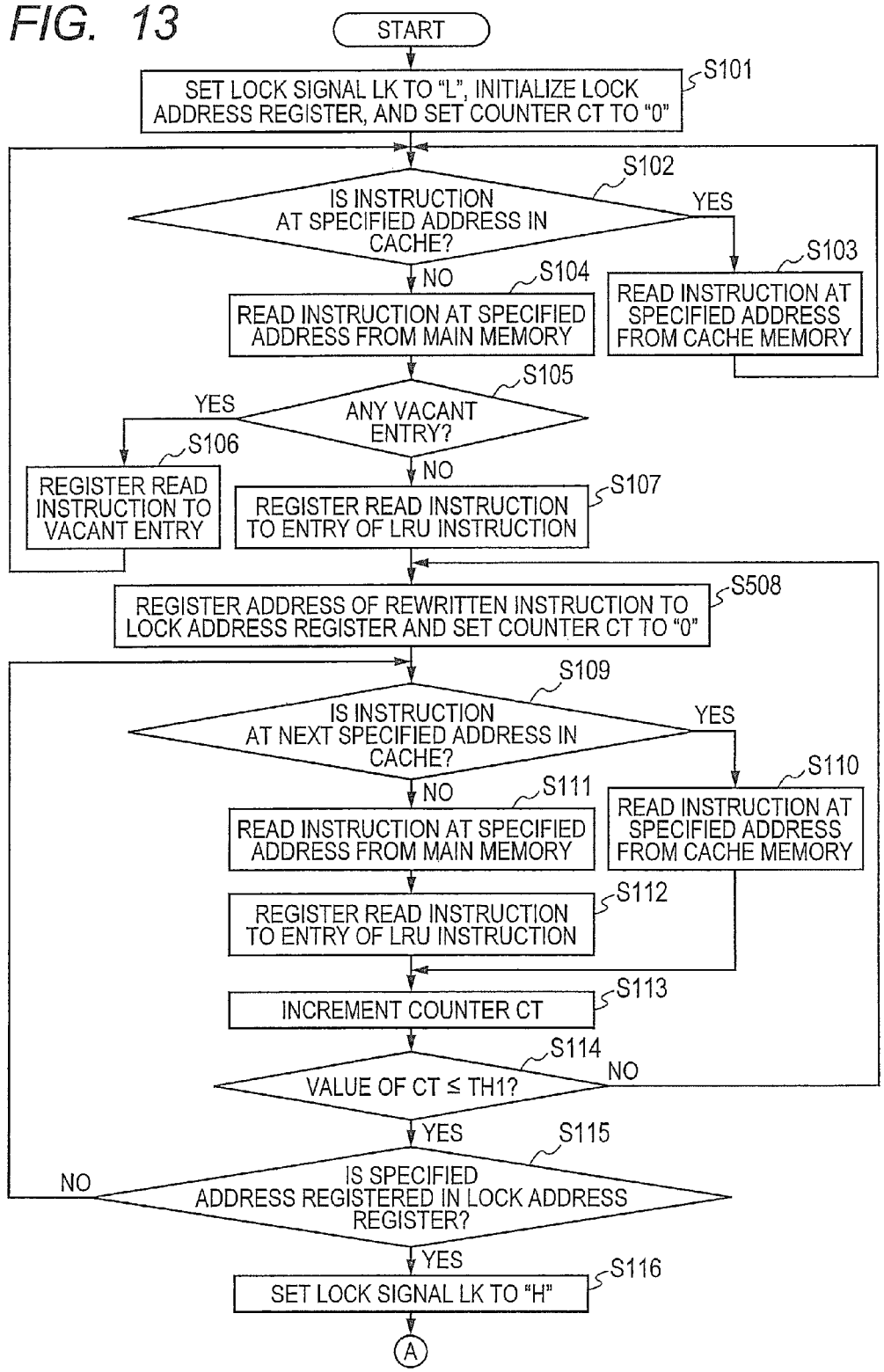
FIG. 13 is a flow chart illustrating the procedure of the cache lock control according to Embodiment 5.
Figure 14:
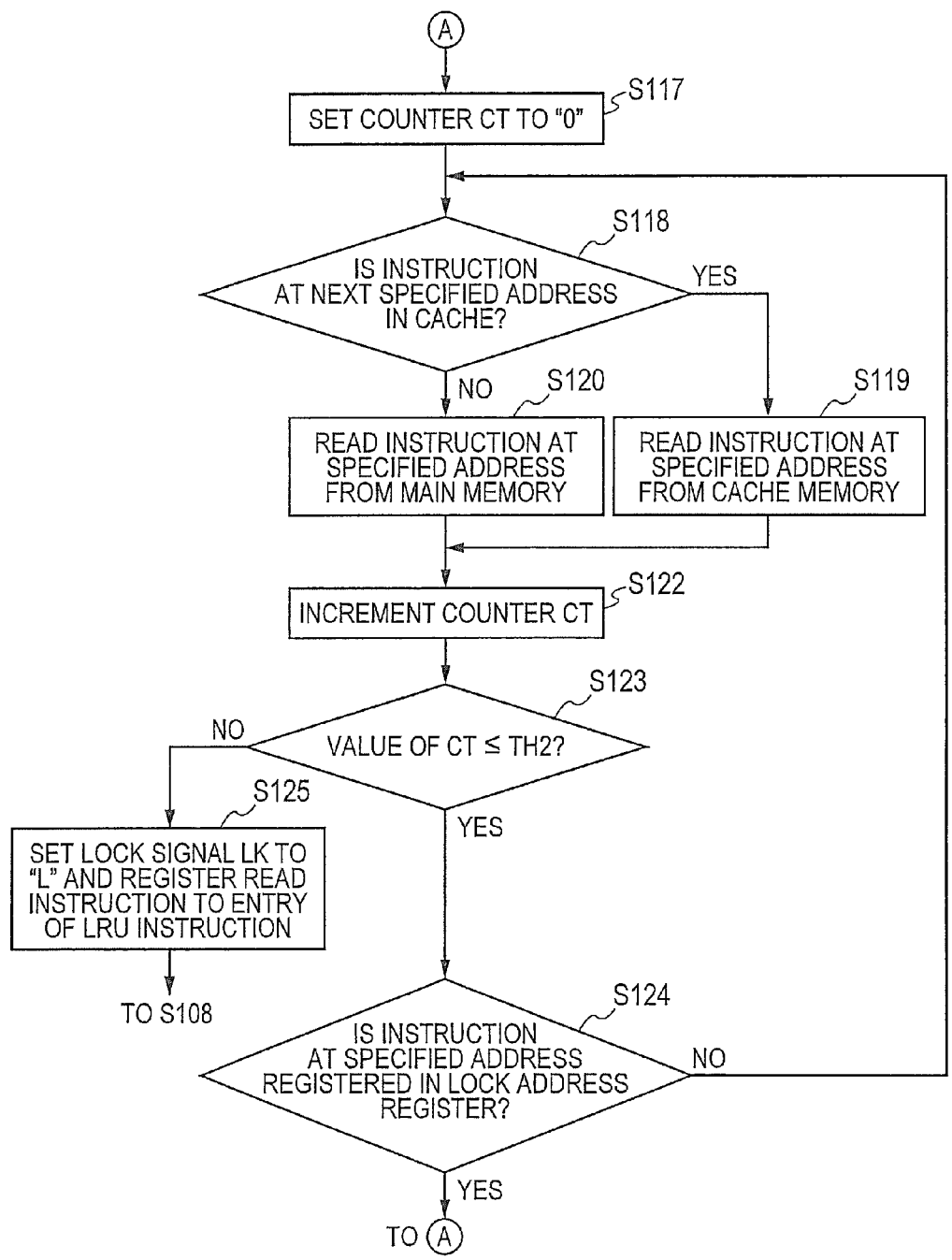
FIG. 14 is a flow chart illustrating the procedure of the cache lock control according to Embodiment 5.

FIGS. 13 and 14 are flow charts illustrating the procedure of the cache lock control according to Embodiment 5.

The flow charts illustrated in FIGS. 13 and 14 are different from the flow charts illustrated in FIGS. 4 and 5 in the following point.

In FIGS. 4 and 5, at Step S108, the lock control unit 6 registers to the lock address register 8 the address of the read instruction (that is, the instruction registered to the cache due to a cache miss), and initializes the value of the counter CT to 0.

On the other hand, in FIGS. 13 and 14, at Step S508, the lock control unit 6 registers to the lock address register 8 the address of an instruction replaced due to a cache miss (that is, the instruction deleted from the cache memory 5), and initializes the value of the counter CT to 0.

(Example of Operation)

Figure 15:
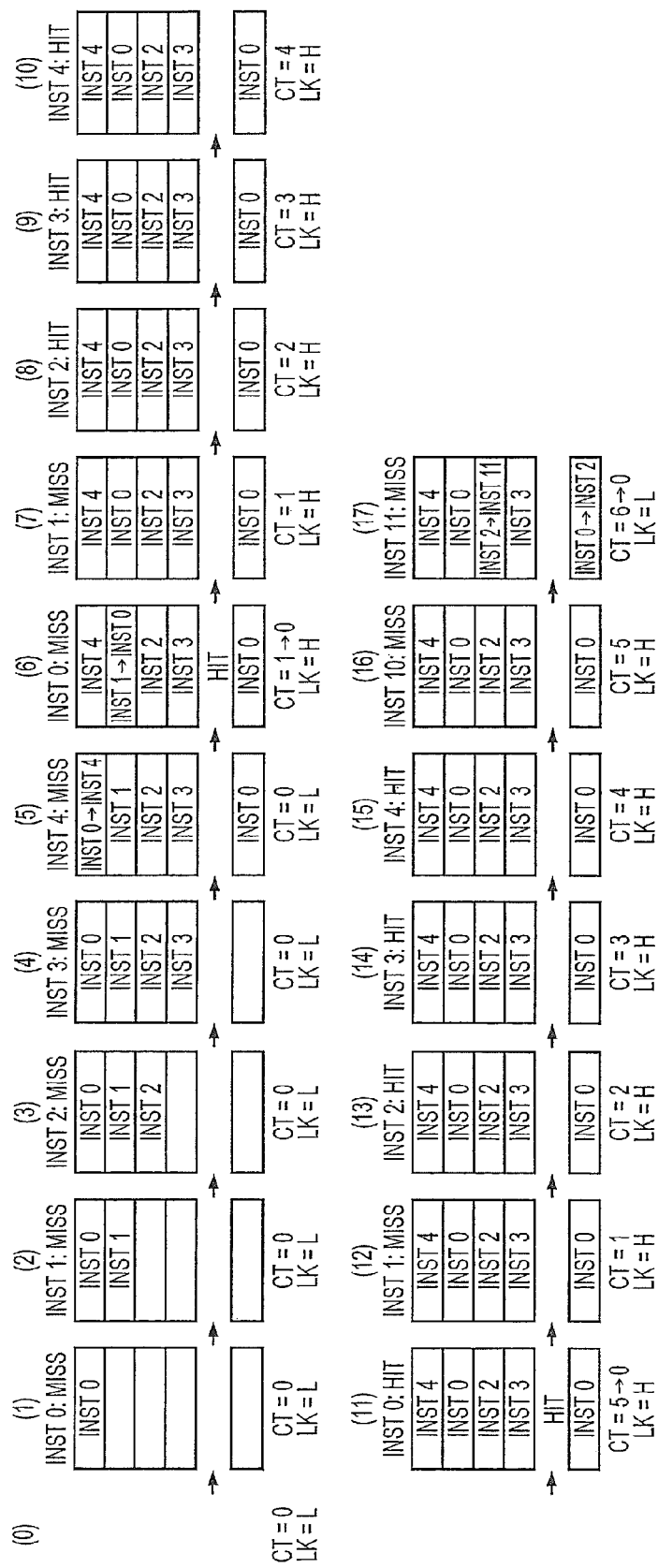
FIG. 15 is a drawing for explaining an example of operation according to Embodiment 5.

FIG. 15 explains an example of operation according to Embodiment 5. As is the case with FIG. 3, in FIG. 15, the cache memory 5 is a fully associative cache memory with the number of entry of 4, and a loop is comprised of five instructions of an instruction 0 through an instruction 4.

At Step (0), the lock control unit 6 initializes the counter CT to 0, deactivates the lock signal LK to an "L" level, and initializes the lock address register 8.

At Step (1), the instruction 0 is not registered in the cache memory 5 (cache miss), therefore, the CPU 3 reads the instruction 0 from the main memory 2 and registers it to the cache memory 5.

At Step (2), the instruction 1 is not registered in the cache memory 5 (cache miss), therefore, the CPU 3 reads the instruction 1 from the main memory 2 and registers it to the cache memory 5.

At Step (3), the instruction 2 is not registered in the cache memory 5 (cache miss), therefore, the CPU 3 reads the instruction 2 from the main memory 2 and registers it to the cache memory 5.

At Step (4), the instruction 3 is not registered in the cache memory 5 (cache miss), therefore, the CPU 3 reads the instruction 3 from the main memory 2 and registers it to the cache memory 5.

At Step (5), the instruction 4 is not registered in the cache memory 5 (cache miss), therefore, the CPU 3 reads the instruction 4 from the main memory 2 and registers the instruction 4 to the cache memory 5 in lieu of the least recently used instruction 0. The lock control unit 6 registers to the lock address register 8 the address of the instruction 0 deleted from the cache memory 5 as a lock address, and initializes the value of the counter CT to 0.

At Step (6), the instruction 0 is not registered in the cache memory 5 (cache miss), therefore, the CPU 3 reads the instruction 0 from the main memory 2 and registers the instruction 0 to the cache memory 5 in lieu of the least recently used instruction 1. The lock control unit 6 increments the counter CT to 1. The value 1 of the counter CT is not greater than the threshold TH1 (=5), and the instruction 0 read from the main memory 2 coincides with the instruction 0 of which the address (lock address) is stored in the lock address register 8. Therefore, the lock control unit 6 activates the lock signal LK to an "H" level, and initializes the value of the counter CT to 0.

At Step (7), the instruction 1 is not registered in the cache memory 5 (cache miss), therefore, the CPU 3 reads the instruction 1 from the main memory 2. The lock signal LK is activated to an "H" level, therefore, the CPU 3 does not update the cache memory 5. The lock control unit 6 increments the counter CT to 1. The value 1 of the counter CT is not greater than the threshold TH2 (=5), and the instruction 1 read from the main memory 2 is different from the instruction 0 of which the address (lock address) is stored in the lock address register 8. Therefore, the lock control unit 6 maintains the lock signal LK, the value of the counter CT, and the stored address in the lock address register 8.

At Step (8), the instruction 2 is registered in the cache memory 5 (cache hit), therefore, the CPU 3 reads the instruction 2 from the cache memory 5. The lock control unit 6 increments the counter CT to 2. The value 2 of the counter CT is not greater than the threshold TH2 (=5), and the instruction 2 read from the cache memory 5 is different from the instruction 0 of which the address (lock address) is stored in the lock address register 8. Therefore, the lock control unit 6 maintains the lock signal LK, the value of the counter CT, and the stored address in the lock address register 8.

At Step (9), the instruction 3 is registered in the cache memory 5 (cache hit), therefore, the CPU 3 reads the instruction 3 from the cache memory 5. The lock control unit 6 increments the counter CT to 3. The value 3 of the counter CT is not greater than the threshold TH2 (=5), and the instruction 3 read from the cache memory 5 is different from the instruction 0 of which the address (lock address) is stored in the lock address register 8. Therefore, the lock control unit 6 maintains the lock signal LK, the value of the counter CT, and the stored address in the lock address register 8.

At Step (10), the instruction 4 is registered in the cache memory 5 (cache hit), therefore, the CPU 3 reads the instruction 4 from the cache memory 5. The lock control unit 6 increments the counter CT to 4. The value 4 of the counter CT is not greater than the threshold TH2 (=5), and the instruction 4 read from the cache memory 5 is different from the instruction 0 of which the address (lock address) is stored in the lock address register 8. Therefore, the lock control unit 6 maintains the lock signal LK, the value of the counter CT, and the stored address in the lock address register 8.

At Step (11), the instruction 0 is registered in the cache memory 5 (cache hit), therefore, the CPU 3 reads the instruction 0 from the cache memory 5. The lock control unit 6 increments the counter CT to 5. The value 5 of the counter CT is not greater than the threshold TH2 (=5), and the instruction 0 read from the main memory 2 coincides with the instruction 0 of which the address (lock address) is stored in the lock address register 8. Therefore, the lock control unit 6 maintains the lock signal LK and the stored address in the lock address register 8, and initializes the value of the counter CT to 0.

At Step (12), the instruction 1 is not registered in the cache memory 5 (cache miss), therefore, the CPU 3 reads the instruction 1 from the main memory 2. The lock signal LK is activated to an "H" level, therefore, the CPU 3 does not update the cache memory 5. The lock control unit 6 increments the counter CT to 1. The value 1 of the counter CT is not greater than the threshold TH2 (=5), and the instruction 1 read from the main memory 2 is different from the instruction 0 of which the address (lock address) is stored in the lock address register 8. Therefore, the lock control unit 6 maintains the lock signal LK, the value of the counter CT, and the stored address in the lock address register 8.

At Step (13), the instruction 2 is registered in the cache memory 5 (cache hit), therefore, the CPU 3 reads the instruction 2 from the cache memory 5. The lock control unit 6 increments the counter CT to 2. The value 2 of the counter CT is not greater than the threshold TH2 (=5), and the instruction 2 read from the cache memory 5 is different from the instruction 0 of which the address (lock address) is stored in the lock address register 8. Therefore, the lock control unit 6 maintains the lock signal LK, the value of the counter CT, and the stored address in the lock address register 8.

At Step (14), the instruction 3 is registered in the cache memory 5 (cache hit), therefore, the CPU 3 reads the instruction 3 from the cache memory 5. The lock control unit 6 increments the counter CT to 3. The value 3 of the counter CT is not greater than the threshold TH2 (=5), and the instruction 3 read from the cache memory 5 is different from the instruction 0 of which the address (lock address) is stored in the lock address register 8. Therefore, the lock control unit 6 maintains the lock signal LK, the value of the counter CT, and the stored address in the lock address register 8.

At Step (15), the instruction 4 is registered in the cache memory 5 (cache hit), therefore, the CPU 3 reads the instruction 4 from the cache memory 5. The lock control unit 6 increments the counter CT to 4. The value 4 of the counter CT is not greater than the threshold TH2 (=5), and the instruction 4 read from the cache memory 5 is different from the instruction 0 of which the address (lock address) is stored in the lock address register 8. Therefore, the lock control unit 6 maintains the lock signal LK, the value of the counter CT, and the stored address in the lock address register 8.

At Step (16), an instruction 10 is not registered in the cache memory 5 (cache miss), therefore, the CPU 3 reads the instruction 10 from the main memory 2. The lock signal LK is activated to an "H" level, therefore, the CPU 3 does not update the cache memory 5. The lock control unit 6 increments the counter CT to 5. The value 5 of the counter CT is not greater than the threshold TH2 (=5), and the instruction 10 read from the main memory 2 is different from the instruction 0 of which the address (lock address) is stored in the lock address register 8. Therefore, the lock control unit 6 maintains the lock signal LK, the value of the counter CT, and the stored address in the lock address register 8.

At Step (17), an instruction 11 is not registered in the cache memory 5 (cache miss), therefore, the CPU 3 reads the instruction 11 from the main memory 2. The lock signal LK is activated to an "H" level, therefore, the CPU 3 does not update the cache memory 5. The lock control unit 6 increments the counter CT to 6. The value 6 of the counter CT is greater than the threshold TH2 (=5). Therefore, the lock control unit 6 deactivates the lock signal LK to an "L" level, and when the lock signal LK is deactivated to an "L" level, the CPU 3 registers the instruction 11 to the cache memory 5 in lieu of the least recently used instruction 2. The lock control unit 6 initializes the value of the counter CT to 0, and registers to the lock address register 8 the address of the instruction 2 deleted from the cache memory 5, as the lock address.

As described above, according to the present embodiment, as is the case with Embodiment 2, when executing a program which has a loop of a size slightly larger than the number of entry of a cache, whether an instruction which configures a loop is read or not is determined by measuring an interval until the instruction registered to the cache memory 5 is read again. When the instruction which configures a loop is read, updating of the cache memory 5 is stopped (locked).

Embodiment 6

Embodiment 6 is different from Embodiment 3 with respect to an instruction to be registered in the lock address register 8.

That is, in Embodiment 3, the lock control unit 6 controls the lock address register 8 so as to hold the address of an instruction which is read from the main memory 2 due to a cache miss and written in the cache memory 5 in lieu of an instruction held in the cache memory 5.

On the other hand, in Embodiment 6, the lock control unit 6 controls the lock address register 8 so as to hold the address of an instruction which is deleted from the cache memory 5 in lieu of an instruction read from the main memory 2 due to the cache miss.

(Operation)

Figure 16:
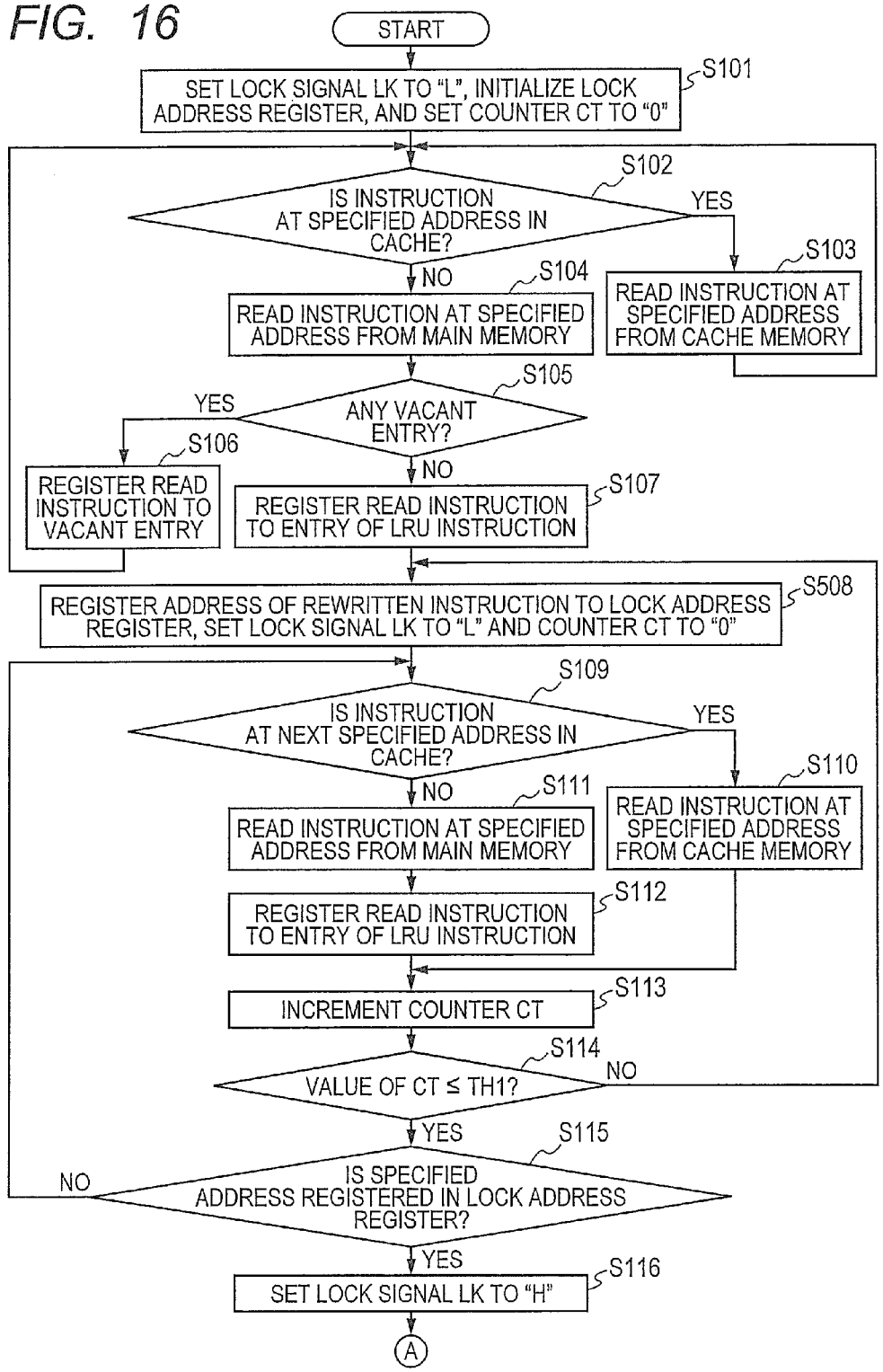
FIG. 16 is a flow chart illustrating the procedure of the cache lock control according to Embodiment 6.
Figure 17:
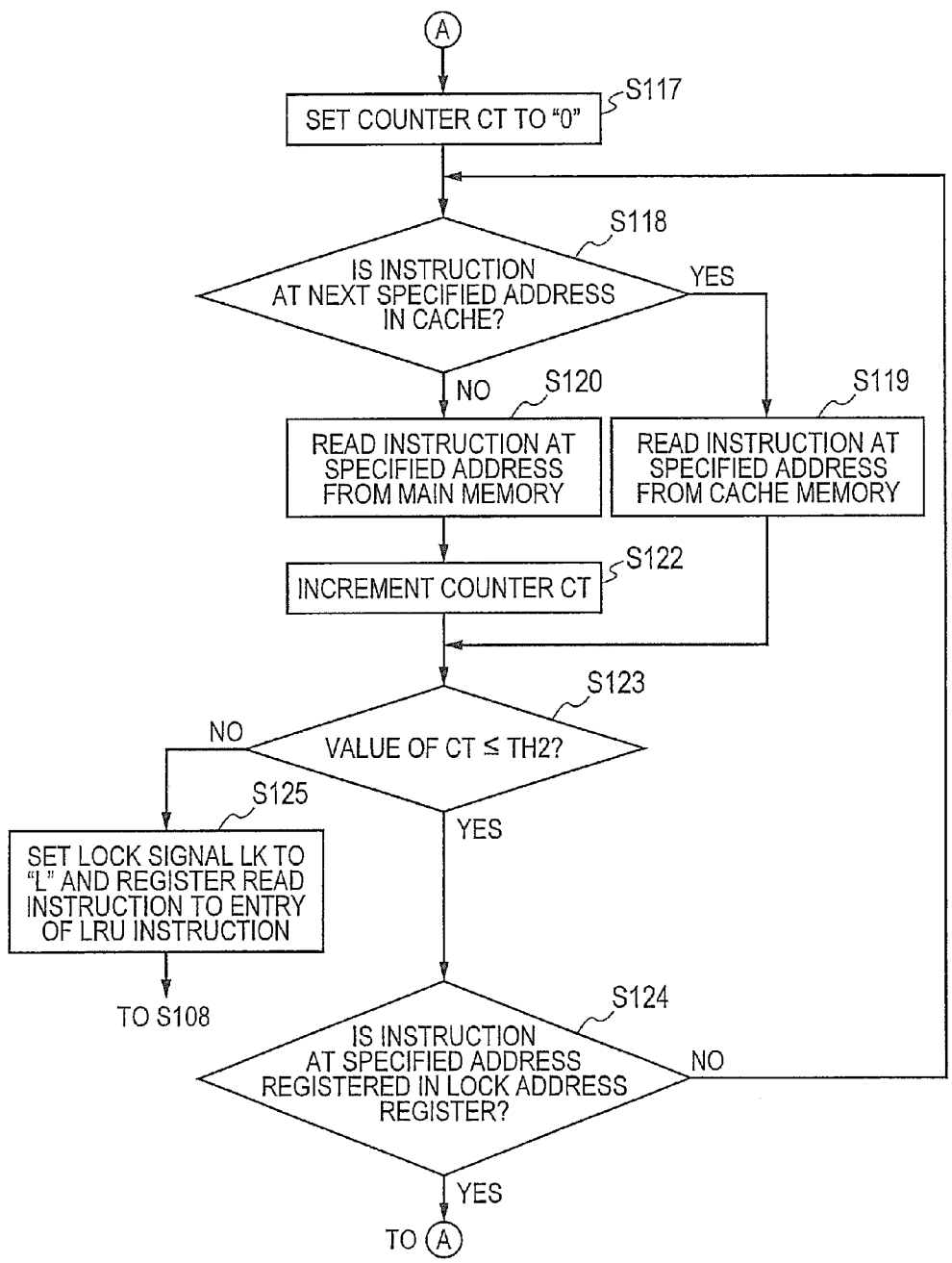
FIG. 17 is a flow chart illustrating the procedure of the cache lock control according to Embodiment 6.

FIGS. 16 and 17 are flow charts illustrating the procedure of the cache lock control according to Embodiment 6.

The flow charts illustrated in FIGS. 16 and 17 are different from the flow charts illustrated in FIGS. 7 and 8 in the following point.

In FIGS. 7 and 8, at Step S108, the lock control unit 6 registers to the lock address register 8 the address of the read instruction (that is, the instruction registered to the cache memory 5 due to a cache miss), and initializes the value of the counter CT to 0.

On the other hand, in FIGS. 16 and 17, at Step S508, the lock control unit 6 registers to the lock address register 8 the address of an instruction replaced due to a cache miss (that is, the instruction deleted from the cache memory 5), and initializes the value of the counter CT to 0.

(Example of Operation)

Figure 18:
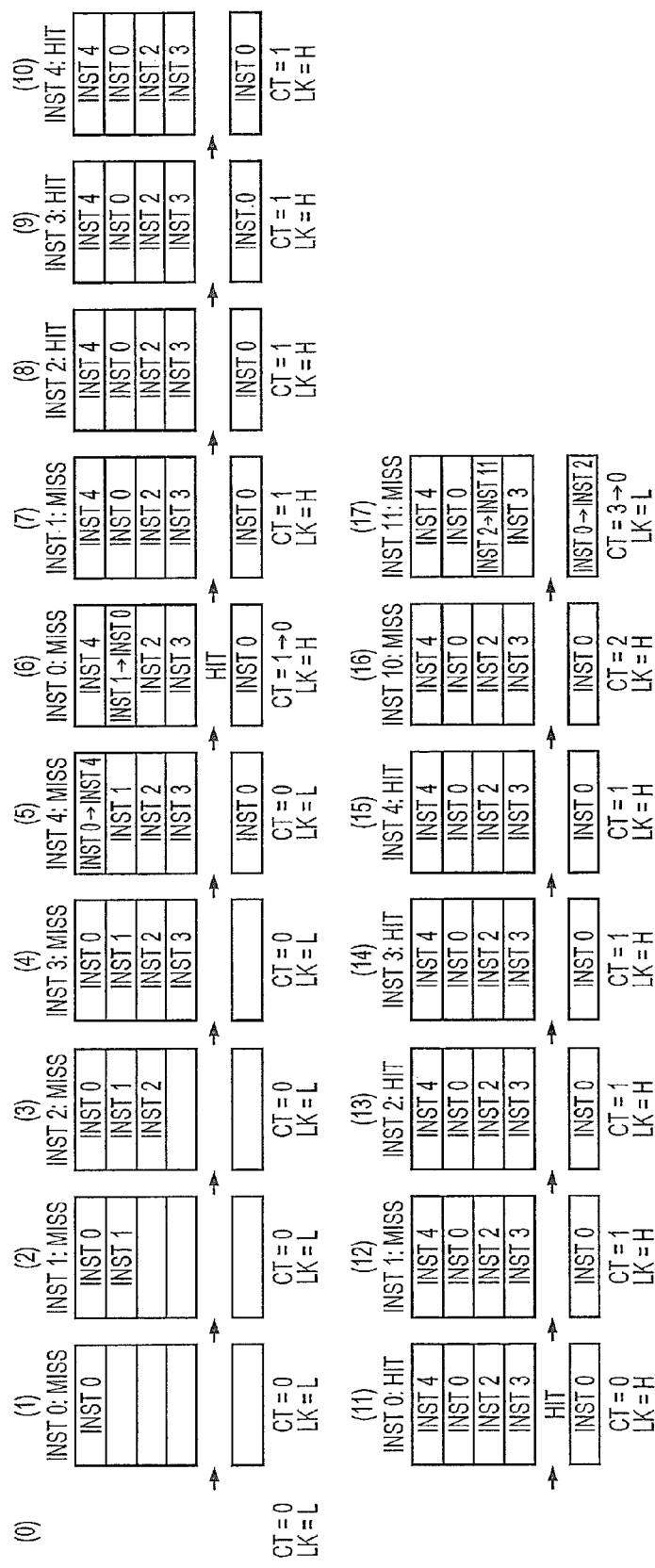
FIG. 18 is a drawing for explaining an example of operation according to Embodiment 6.

FIG. 18 explains an example of operation according to Embodiment 6. As is the case with FIG. 3, in FIG. 18, the cache memory 5 is a fully associative cache memory with the number of entry of 4, and a loop is comprised of five instructions of an instruction 0 through an instruction 4.

At Step (0), the lock control unit 6 initializes the counter CT to 0, deactivates the lock signal LK to an "L" level, and initializes the lock address register 8.

At Step (1), the instruction 0 is not registered in the cache memory 5 (cache miss), therefore, the CPU 3 reads the instruction 0 from the main memory 2 and registers it to the cache memory 5.

At Step (2), the instruction 1 is not registered in the cache memory 5 (cache miss), therefore, the CPU 3 reads the instruction 1 from the main memory 2 and registers it to the cache memory 5.

At Step (3), the instruction 2 is not registered in the cache memory 5 (cache miss), therefore, the CPU 3 reads the instruction 2 from the main memory 2 and registers it to the cache memory 5.

At Step (4), the instruction 3 is not registered in the cache memory 5 (cache miss), therefore, the CPU 3 reads the instruction 3 from the main memory 2 and registers it to the cache memory 5.

At Step (5), the instruction 4 is not registered in the cache memory 5 (cache miss), therefore, the CPU 3 reads the instruction 4 from the main memory 2 and registers the instruction 4 to the cache memory 5 in lieu of the least recently used instruction 0. The lock control unit 6 registers to the lock address register 8 the address of the instruction 0 deleted from the cache memory 5, and initializes the value of the counter CT to 0.

At Step (6), the instruction 0 is not registered in the cache memory 5 (cache miss), therefore, the CPU 3 reads the instruction 0 from the main memory 2 and registers the instruction 0 to the cache memory 5 in lieu of the least recently used instruction 1. The lock control unit 6 increments the counter CT to 1. The value 1 of the counter CT is not greater than the threshold TH1 (=5), and the instruction 0 read from the main memory 2 coincides with the instruction 0 of which the address (lock address) is stored in the lock address register 8. Therefore, the lock control unit 6 activates the lock signal LK to an "H" level, and initializes the value of the counter CT to 0.

At Step (7), the instruction 1 is not registered in the cache memory 5 (cache miss), therefore, the CPU 3 reads the instruction 1 from the main memory 2. The lock signal LK is activated to an "H" level, therefore, the CPU 3 does not update the cache memory 5. The lock control unit 6 increments the counter CT to 1 because a cache miss has occurred. The value 1 of the counter CT is not greater than the threshold TH2 (=2), and the instruction 1 read from the main memory 2 is different from the instruction 0 of which the address (lock address) is stored in the lock address register 8. Therefore, the lock control unit 6 maintains the lock signal LK, the value of the counter CT, and the stored address in the lock address register 8.

At Step (8), the instruction 2 is registered in the cache memory 5 (cache hit), therefore, the CPU 3 reads the instruction 2 from the cache memory 5. The lock control unit 6 maintains the counter CT at 1 because a cache hit has occurred. The value 1 of the counter CT is not greater than the threshold TH2 (=2), and the instruction 2 read from the cache memory 5 is different from the instruction 0 of which the address (lock address) is stored in the lock address register 8. Therefore, the lock control unit 6 maintains the lock signal LK, the value of the counter CT, and the stored address in the lock address register 8.

At Step (9), the instruction 3 is registered in the cache memory 5 (cache hit), therefore, the CPU 3 reads the instruction 3 from the cache memory 5. The lock control unit 6 maintains the counter CT at 1 because a cache hit has occurred. The value 1 of the counter CT is not greater than the threshold TH2 (=2), and the instruction 3 read from the cache memory 5 is different from the instruction 0 of which the address (lock address) is stored in the lock address register 8. Therefore, the lock control unit 6 maintains the lock signal LK, the value of the counter CT, and the stored address in the lock address register 8.

At Step (10), the instruction 4 is registered in the cache memory 5 (cache hit), therefore, the CPU 3 reads the instruction 4 from the cache memory 5. The lock control unit 6 maintains the counter CT at 1 because a cache hit has occurred. The value 1 of the counter CT is not greater than the threshold TH2 (=2), and the instruction 4 read from the cache memory 5 is different from the instruction 0 of which the address (lock address) is stored in the lock address register 8. Therefore, the lock control unit 6 maintains the lock signal LK, the value of the counter CT, and the stored address in the lock address register 8.

At Step (11), the instruction 0 is registered in the cache memory 5 (cache hit), therefore, the CPU 3 reads the instruction 0 from the cache memory 5. The lock control unit 6 maintains the counter CT at 1 because a cache hit has occurred. The value 1 of the counter CT is not greater than the threshold TH2 (=2), and the instruction 0 read from the main memory 5 coincides with the instruction 0 of which the address (lock address) is stored in the lock address register 8. Therefore, the lock control unit 6 maintains the lock signal LK and the stored address in the lock address register 8, and initializes the value of the counter CT to 0.

At Step (12), the instruction 1 is not registered in the cache memory 5 (cache miss), therefore, the CPU 3 reads the instruction 1 from the main memory 2. The lock signal LK is activated to an "H" level, therefore, the CPU 3 does not update the cache memory 5. The lock control unit 6 increments the counter CT to 1. The value 1 of the counter CT is not greater than the threshold TH2 (=2), and the instruction 1 read from the main memory 2 is different from the instruction 0 of which the address (lock address) is stored in the lock address register 8. Therefore, the lock control unit 6 maintains the lock signal LK, the value of the counter CT, and the stored address in the lock address register 8.

At Step (13), the instruction 2 is registered in the cache memory 5 (cache hit), therefore, the CPU 3 reads the instruction 2 from the cache memory 5. The lock control unit 6 maintains the counter CT at 1 because a cache hit has occurred. The value 1 of the counter CT is not greater than the threshold TH2 (=2), and the instruction 2 read from the cache memory 5 is different from the instruction 0 of which the address (lock address) is stored in the lock address register 8. Therefore, the lock control unit 6 maintains the lock signal LK, the value of the counter CT, and the stored address in the lock address register 8.

At Step (14), the instruction 3 is registered in the cache memory 5 (cache hit), therefore, the CPU 3 reads the instruction 3 from the cache memory 5. The lock control unit 6 maintains the counter CT at 1 because a cache hit has occurred. The value 1 of the counter CT is not greater than the threshold TH2 (=2), and the instruction 3 read from the cache memory 5 is different from the instruction 0 of which the address (lock address) is stored in the lock address register 8. Therefore, the lock control unit 6 maintains the lock signal LK, the value of the counter CT, and the stored address in the lock address register 8.

At Step (15), the instruction 4 is registered in the cache memory 5 (cache hit), therefore, the CPU 3 reads the instruction 4 from the cache memory 5. The lock control unit 6 maintains the counter CT at 1 because a cache hit has occurred. The value 1 of the counter CT is not greater than the threshold TH2 (=2), and the instruction 4 read from the cache memory 5 is different from the instruction 0 of which the address (lock address) is stored in the lock address register 8. Therefore, the lock control unit 6 maintains the lock signal LK, the value of the counter CT, and the stored address in the lock address register 8.

At Step (16), an instruction 10 is not registered in the cache memory 5 (cache miss), therefore, the CPU 3 reads the instruction 10 from the main memory 2. The lock signal LK is activated to an "H" level, therefore, the CPU 3 does not update the cache memory 5. The lock control unit 6 increments the counter CT to 2 because a cache miss has occurred. The value 2 of the counter CT is not greater than the threshold TH2 (=2), and the instruction 10 read from the main memory 2 is different from the instruction 0 of which the address (lock address) is stored in the lock address register 8. Therefore, the lock control unit 6 maintains the lock signal LK, the value of the counter CT, and the stored address in the lock address register 8.

At Step (17), an instruction 11 is not registered in the cache memory 5 (cache miss), therefore, the CPU 3 reads the instruction 11 from the main memory 2. The lock signal LK is activated to an "H" level, therefore, the CPU 3 does not update the cache memory 5. The lock control unit 6 increments the counter CT to 3 because a cache miss has occurred. The value 3 of the counter CT is greater than the threshold TH2 (=2). Therefore, the lock control unit 6 deactivates the lock signal LK to an "L" level, and when the lock signal LK is deactivated to an "L" level, the CPU 3 registers the instruction 11 to the cache memory 5 in lieu of the least recently used instruction 2. The lock control unit 6 initializes the value of the counter CT to 0, and registers to the lock address register 8 the address of the instruction 2 deleted from the cache memory 5, as the lock address.

As described above, according to the present embodiment, as is the case with Embodiment 2, when executing a program which has a loop of a size slightly larger than the number of entry of a cache, whether an instruction which configures a loop is read or not is determined by measuring an interval until the instruction registered to the cache memory 5 is read again. When the instruction which configures a loop is read, updating of the cache memory 5 is stopped (locked).

Embodiment 7

Embodiment 7 is different from Embodiment 4 with respect to an instruction to be registered in the lock address register 8.

That is, in Embodiment 4, the lock control unit 6 controls the lock address register 8 so as to hold the address of an instruction which is read from the main memory 2 due to a cache miss and written in the cache memory 5 in lieu of an instruction held in the cache memory 5.

On the other hand, in Embodiment 7, the lock control unit 6 controls the lock address register 8 so as to hold the address of an instruction deleted from the cache memory 5 in lieu of an instruction read from the main memory 2 due to the cache miss.

(Operation)

Figure 19:
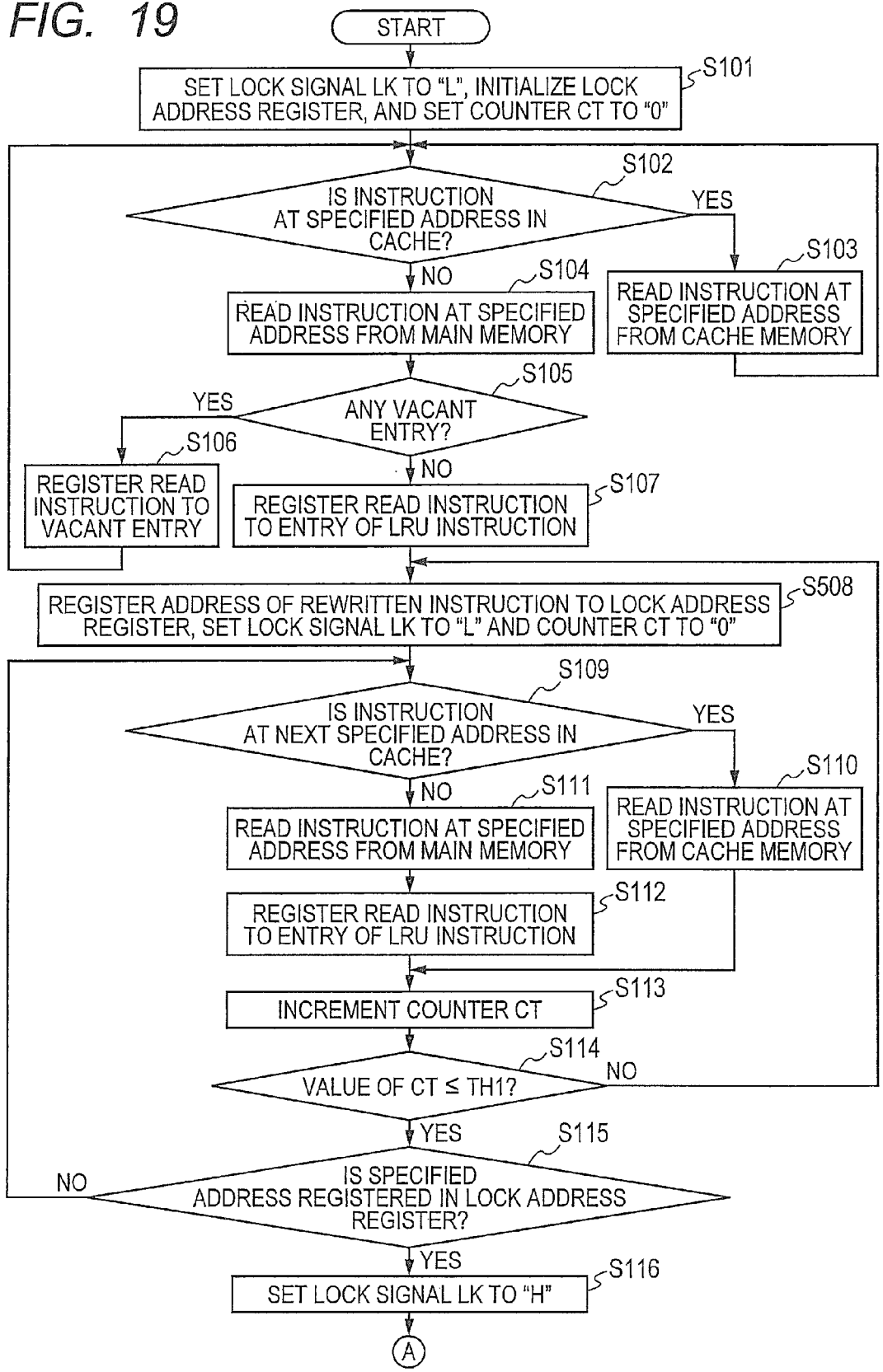
FIG. 19 is a flow chart illustrating the procedure of the cache lock control according to Embodiment 7.
Figure 20:
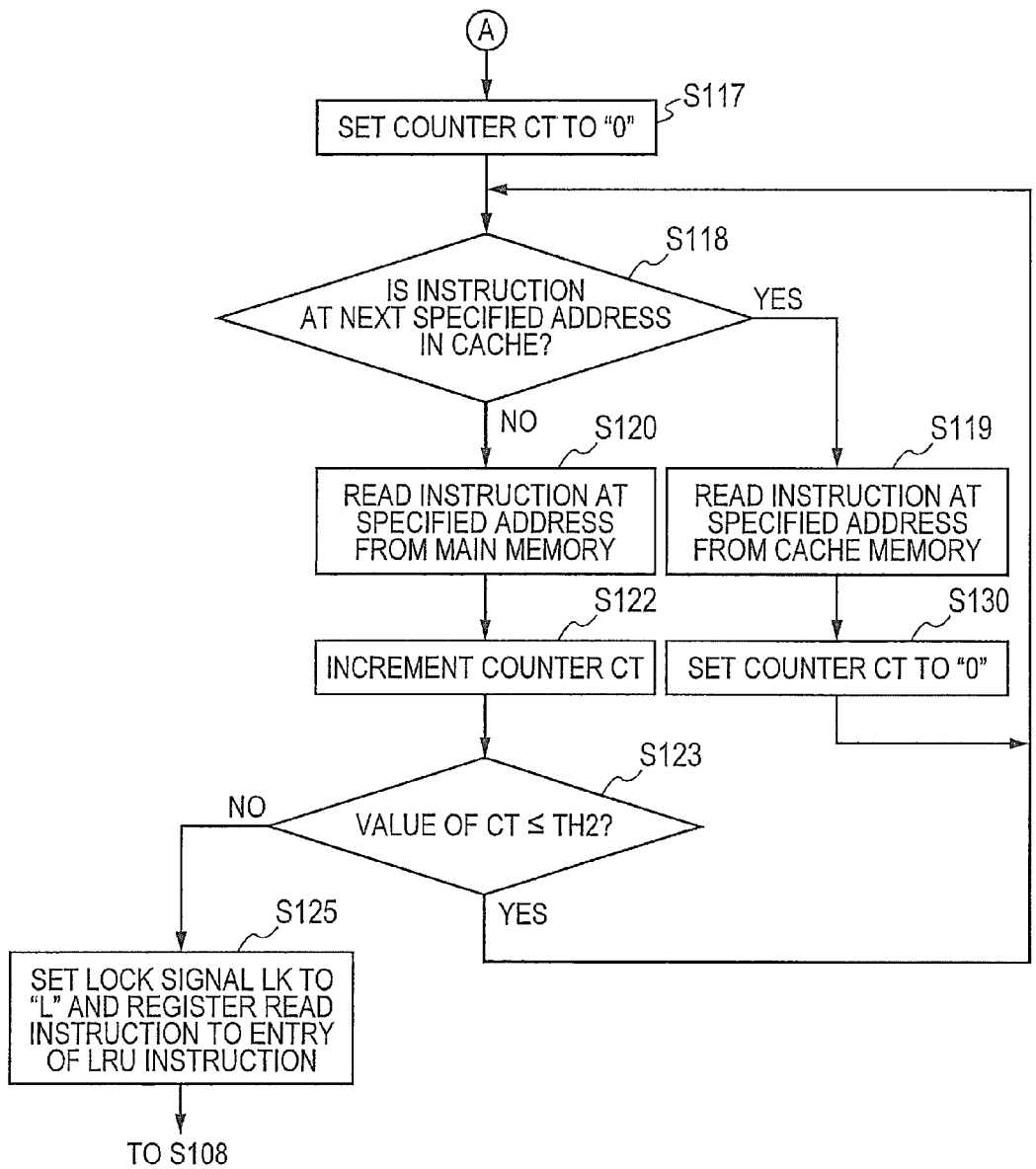
FIG. 20 is a flow chart illustrating the procedure of the cache lock control according to Embodiment 7.

FIGS. 19 and 20 are flowcharts illustrating the procedure of the cache lock control according to Embodiment 7.

The flow charts illustrated in FIGS. 19 and 20 are different from the flow charts illustrated in FIGS. 10 and 11 in the following point.

In FIGS. 10 and 11, at Step S108, the lock control unit 6 registers to the lock address register 8 the address of the read instruction (that is, the instruction registered to the cache memory 5 due to a cache miss), and initializes the value of the counter CT to 0.

On the other hand, in FIGS. 19 and 20, at Step S508, the lock control unit 6 registers to the lock address register 8 the address of an instruction replaced due to a cache miss (that is, the instruction deleted from the cache memory 5), and initializes the value of the counter CT to 0.

(Example of Operation)

Figure 21:
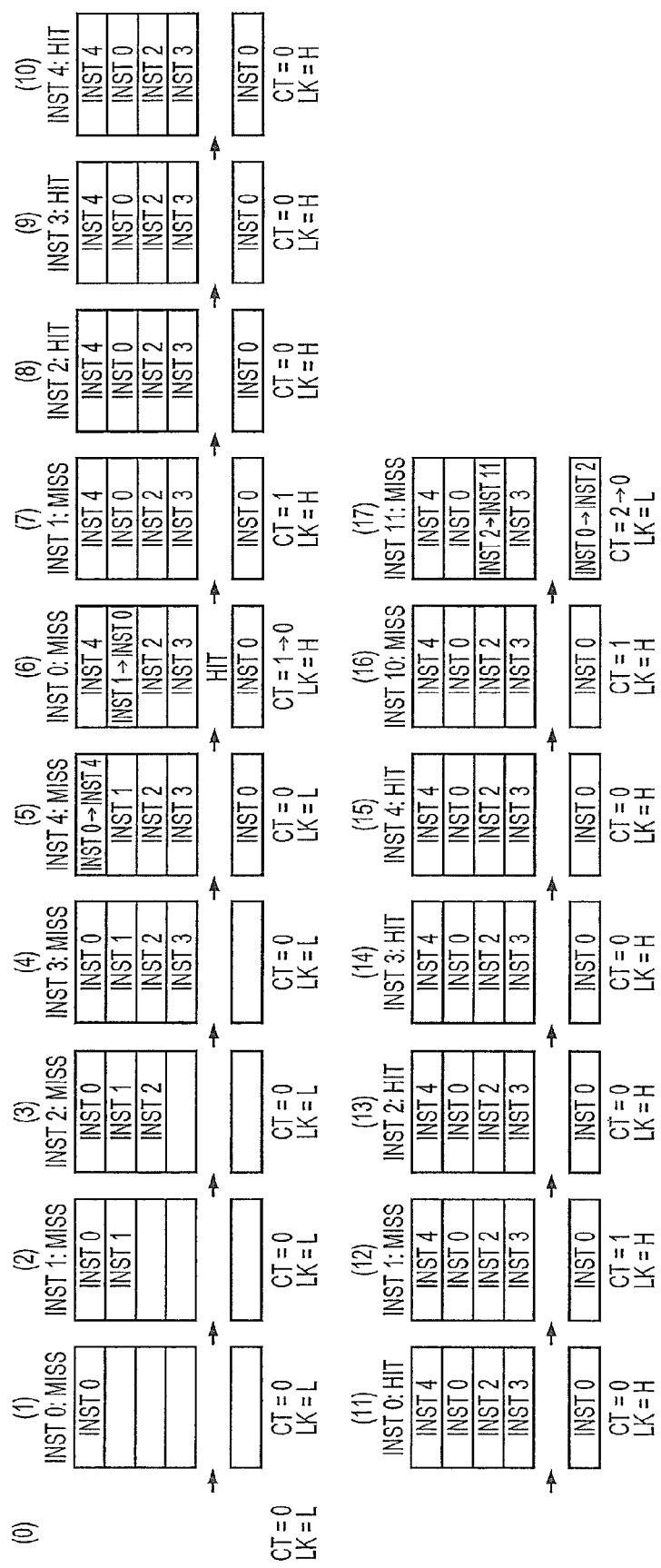
FIG. 21 is a drawing for explaining an example of operation according to Embodiment 7.

FIG. 21 explains an example of operation according to Embodiment 7. As is the case with FIG. 3, in FIG. 21, the cache memory 5 is a fully associative cache memory with the number of entry of 4, and a loop is comprised of five instructions of an instruction 0 through an instruction 4.

At Step (0), the lock control unit 6 initializes the counter CT to 0, deactivates the lock signal LK to an "L" level, and initializes the lock address register 8.

At Step (1), the instruction 0 is not registered in the cache memory 5 (cache miss), therefore, the CPU 3 reads the instruction 0 from the main memory 2 and registers it to the cache memory 5.

At Step (2), the instruction 1 is not registered in the cache memory 5 (cache miss), therefore, the CPU 3 reads the instruction 1 from the main memory 2 and registers it to the cache memory 5.

At Step (3), the instruction 2 is not registered in the cache memory 5 (cache miss), therefore, the CPU 3 reads the instruction 2 from the main memory 2 and registers it to the cache memory 5.

At Step (4), the instruction 3 is not registered in the cache memory 5 (cache miss), therefore, the CPU 3 reads the instruction 3 from the main memory 2 and registers it to the cache memory 5.

At Step (5), the instruction 4 is not registered in the cache memory 5 (cache miss), therefore, the CPU 3 reads the instruction 4 from the main memory 2 and registers the instruction 4 to the cache memory 5 in lieu of the least recently used instruction 0. The lock control unit 6 registers to the lock address register 8 the address of the instruction 0 deleted from the cache memory 5 as a lock address, and initializes the value of the counter CT to 0.

At Step (6), the instruction 0 is not registered in the cache memory 5 (cache miss), therefore, the CPU 3 reads the instruction 0 from the main memory 2 and registers the instruction 0 to the cache memory 5 in lieu of the least recently used instruction 1. The lock control unit 6 increments the counter CT to 1. The value 1 of the counter CT is not greater than the threshold TH1 (=5), and the instruction 0 read from the main memory 2 coincides with the instruction 0 of which the address (lock address) is stored in the lock address register 8. Therefore, the lock control unit 6 activates the lock signal LK to an "H" level, and initializes the value of the counter CT to 0.

At Step (7), the instruction 1 is not registered in the cache memory 5 (cache miss), therefore, the CPU 3 reads the instruction 1 from the main memory 2. The lock signal LK is activated to an "H" level, therefore, the CPU 3 does not update the cache memory 5. The lock control unit 6 increments the counter CT to 1 because a cache miss has occurred. The value 1 of the counter CT is not greater than the threshold TH2 (=1), therefore, the lock control unit 6 maintains the lock signal LK, the value of the counter CT, and the stored address in the lock address register 8.

At Step (8), the instruction 2 is registered in the cache memory 5 (cache hit), therefore, the CPU 3 reads the instruction 2 from the cache memory 5. The lock control unit 6 initializes the counter CT to 0 because a cache hit has occurred. The value 0 of the counter CT is not greater than the threshold TH2 (=1). Therefore, the lock control unit 6 maintains the lock signal LK, the value of the counter CT, and the stored address in the lock address register 8.

At Step (9), the instruction 3 is registered in the cache memory 5 (cache hit), therefore, the CPU 3 reads the instruction 3 from the cache memory 5. The lock control unit 6 initializes the counter CT to 0 because a cache hit has occurred. The value 0 of the counter CT is not greater than the threshold TH2 (=1). Therefore, the lock control unit 6 maintains the lock signal LK, the value of the counter CT, and the stored address in the lock address register 8.

At Step (10), the instruction 4 is registered in the cache memory 5 (cache hit), therefore, the CPU 3 reads the instruction 4 from the cache memory 5. The lock control unit 6 initializes the counter CT to 0 because a cache hit has occurred. The value 0 of the counter CT is not greater than the threshold TH2 (=1). Therefore, the lock control unit 6 maintains the lock signal LK, the value of the counter CT, and the stored address in the lock address register 8.

At Step (11), the instruction 0 is registered in the cache memory 5 (cache hit), therefore, the CPU 3 reads the instruction 0 from the cache memory 5. The lock control unit 6 initializes the counter CT to 0 because a cache hit has occurred. The value 0 of the counter CT is not greater than the threshold TH2 (=1). Therefore, the lock control unit 6 maintains the lock signal LK, the value of the counter CT, and the stored address in the lock address register 8.

At Step (12), the instruction 1 is not registered in the cache memory 5 (cache miss), therefore, the CPU 3 reads the instruction 1 from the main memory 2. The lock signal LK is activated to an "H" level, therefore, the CPU 3 does not update the cache memory 5. The lock control unit 6 increments the counter CT to 1. The value 1 of the counter CT is not greater than the threshold TH2 (=1). Therefore, the lock control unit 6 maintains the lock signal LK, the value of the counter CT, and the stored address in the lock address register 8.

At Step (13), the instruction 2 is registered in the cache memory 5 (cache hit), therefore, the CPU 3 reads the instruction 2 from the cache memory 5. The lock control unit 6 initializes the counter CT to 0 because a cache hit has occurred. The value 0 of the counter CT is not greater than the threshold TH2 (=1). Therefore, the lock control unit 6 maintains the lock signal LK, the value of the counter CT, and the stored address in the lock address register 8.

At Step (14), the instruction 3 is registered in the cache memory 5 (cache hit), therefore, the CPU 3 reads the instruction 3 from the cache memory 5. The lock control unit 6 initializes the counter CT to 0 because a cache hit has occurred. The value 0 of the counter CT is not greater than the threshold TH2 (=1). Therefore, the lock control unit 6 maintains the lock signal LK, the value of the counter CT, and the stored address in the lock address register 8.

At Step (15), the instruction 4 is registered in the cache memory 5 (cache hit), therefore, the CPU 3 reads the instruction 4 from the cache memory 5. The lock control unit 6 initializes the counter CT to 0 because a cache hit has occurred. The value 0 of the counter CT is not greater than the threshold TH2 (=1). Therefore, the lock control unit 6 maintains the lock signal LK, the value of the counter CT, and the stored address in the lock address register 8.

At Step (16), an instruction 10 is not registered in the cache memory 5 (cache miss), therefore, the CPU 3 reads the instruction 10 from the main memory 2. The lock signal LK is activated to an "H" level, therefore, the CPU 3 does not update the cache memory 5. The lock control unit 6 increments the counter CT to 1 because a cache miss has occurred. The value 1 of the counter CT is not greater than the threshold TH2 (=1). Therefore, the lock control unit 6 maintains the lock signal LK, the value of the counter CT, and the stored address in the lock address register 8.

At Step (17), an instruction 11 is not registered in the cache memory 5 (cache miss), therefore, the CPU 3 reads the instruction 11 from the main memory 2. The lock signal LK is activated to an "H" level, therefore, the CPU 3 does not update the cache memory 5. The lock control unit 6 increments the counter CT to 2 because a cache miss has occurred. The value 2 of the counter CT is greater than the threshold TH2 (=1). Therefore, the lock control unit 6 deactivates the lock signal LK to an "L" level, and when the lock signal LK is deactivated to an "L" level, the CPU 3 registers the instruction 11 to the cache memory 5 in lieu of the least recently used instruction 2. The lock control unit 6 initializes the value of the counter CT to 0, and registers to the lock address register 8 the address of the instruction 2 deleted from the cache memory 5.

As described above, according to the present embodiment, as is the case with Embodiment 2, when executing a program which has a loop of a size slightly larger than the number of entry of a cache, whether an instruction which configures a loop is read or not is determined by measuring an interval until the instruction registered to the cache memory 5 is read again. When the instruction which configures a loop is read, updating of the cache memory 5 is stopped (locked).

As described above, the invention accomplished by the present inventors has been concretely explained based on various embodiments. However, it cannot be overemphasized that the present invention is not restricted to the embodiments, and it can be changed variously in the range which does not deviate from the gist.

What is claimed is:

1. A semiconductor device comprising:
   a main memory operable to store an instruction;
   a cache memory operable to store the instruction temporarily;
   a CPU (Central Processing Unit) operable to read an instruction from one of the main memory and the cache memory and operable to execute the instruction; and
   a cache control unit operable to stop updating of an instruction in the cache memory when the same instruction as the instruction read in the past is again read within a prescribed number of reads.

2. The semiconductor device according to claim 1,
   wherein the cache control unit comprises:
   a register; and
   a lock control unit operable to control the register so as to hold the address of an instruction which is read from the main memory due to a cache miss and written in the cache memory in lieu of an instruction held in the cache memory, and
   wherein the lock control unit stops updating of the instruction in the cache memory when the address of the instruction read from one of the main memory and the cache memory coincides with the address held in the register.

3. The semiconductor device according to claim 1,
   wherein the cache control unit comprises:
   a register; and
   a lock control unit operable to control the register so as to hold the address of an instruction deleted from the cache memory in lieu of an instruction read from the main memory due to the cache miss, and
   wherein the lock control unit stops updating of the instruction in the cache memory when the address of the instruction read from one of the main memory and the cache memory coincides with the address held in the register.

4. The semiconductor device according to claim 2,
   wherein the lock control unit cancels the stop of updating of the cache memory, when the number of continuous cache misses is greater than a prescribed value after stop of updating of the cache memory.

5. The semiconductor device according to claim 1,
   wherein the cache control unit comprises:
   a counter;
   a register; and
   a lock control unit operable to increment the counter whenever an instruction is read from one of the main memory and the cache memory,
   wherein the lock control unit controls the register so as to hold the address of an instruction which is read from the main memory due to a cache miss and written in the cache memory in lieu of an instruction held in the cache memory, and
   wherein the lock control unit stops updating of the instruction in the cache memory when the counter is below a prescribed value and when the address of the instruction read from one of the main memory and the cache memory coincides with the address held in the register.

6. The semiconductor device according to claim 1,
   wherein the cache control unit comprises:
   a counter;
   a register; and
   a lock control unit operable to increment the counter whenever an instruction is read from one of the main memory and the cache memory,
   wherein the lock control unit controls the register so as to hold the address of an instruction deleted from the cache memory in lieu of an instruction read from the main memory due to the cache miss, and
   wherein the lock control unit stops updating of the instruction in the cache memory when the counter is below a prescribed value and when the address of the instruction read from one of the main memory and the cache memory coincides with the address held in the register.

7. The semiconductor device according to claim 5,
   wherein the lock control unit updates the data in the register by use of the address of an instruction read from one of the main memory and the cache memory and resets the counter to an initial value, when the value of the counter becomes greater than the prescribed value, before the stop of updating of the instruction in the cache memory.

8. The semiconductor device according to claim 5,
   wherein the lock control unit resets the counter to an initial value when the updating of the cache memory is stopped,
   wherein the lock control unit increments the counter whenever an instruction is read from one of the main memory and the cache memory after the updating is stopped,
   wherein the lock control unit resets the counter to an initial value, when the address of the instruction read from one of the main memory and the cache memory coincides with the address held in the register, and
   wherein the lock control unit cancels the stop of updating of the cache memory, when the value of the counter is greater than a prescribed value.

9. The semiconductor device according to claim 5,
   wherein the lock control unit resets the counter to an initial value when the updating of the cache memory is stopped,
   wherein the lock control unit increments the counter for every cache miss after the stop of the updating,
   wherein the lock control unit resets the counter to an initial value, when the address of the instruction read from one of the main memory and the cache memory coincides with the address held in the register, and
   wherein the lock control unit cancels the stop of updating of the cache memory, when the value of the counter is greater than a prescribed value.

10. The semiconductor device according to claim 5,
    wherein the lock control unit resets the counter to an initial value when the updating of the cache memory is stopped,
    wherein, after the stop of the updating, the lock control unit increments the counter for every cache miss and resets the counter to an initial value for every cache hit, and wherein the lock control unit cancels the stop of updating of the cache memory when the value of the counter is greater than a prescribed value.

11. The semiconductor device according to claim 1, wherein the cache control unit comprises:
a lock control unit that controls a register so as to hold the address of an instruction which is read from the main memory due to a cache miss and written in the cache memory in lieu of an instruction held in the cache memory.

12. The semiconductor device according to claim 1, wherein the cache control unit comprises:
a lock control unit that stops updating of the instruction in the cache memory when a counter is below a prescribed value and when the address of the instruction read from one of the main memory and the cache memory coincides with the address held in a register.

13. A semiconductor device comprising:
a main memory operable to store an instruction;
a cache memory operable to store the instruction temporarily;
a controller operable to read an instruction from one of the main memory and the cache memory and operable to execute the instruction; and
a cache control unit operable to control updating of an instruction in the cache memory when the same instruction as the instruction read in the past is again read within a prescribed number of reads.

14. The semiconductor device according to claim 13, wherein the cache control unit comprises:
a register; and
a lock control unit operable to control the register so as to hold the address of an instruction which is read from the main memory due to a cache miss and written in the cache memory in lieu of an instruction held in the cache memory, and
wherein the lock control unit stops updating of the instruction in the cache memory when the address of the instruction read from one of the main memory and the cache memory coincides with the address held in the register.

15. The semiconductor device according to claim 13, wherein the cache control unit comprises:
a register; and
a lock control unit operable to control the register so as to hold the address of an instruction deleted from the cache memory in lieu of an instruction read from the main memory due to the cache miss, and
wherein the lock control unit stops updating of the instruction in the cache memory when the address of the instruction read from one of the main memory and the cache memory coincides with the address held in the register.

16. The semiconductor device according to claim 14, wherein the lock control unit cancels the stop of updating of the cache memory, when the number of continuous cache misses is greater than a prescribed value after stop of updating of the cache memory.

17. The semiconductor device according to claim 13, wherein the cache control unit comprises:
a counter;
a register; and
a lock control unit operable to increment the counter whenever an instruction is read from one of the main memory and the cache memory,
wherein the lock control unit controls the register so as to hold the address of an instruction which is read from the main memory due to a cache miss and written in the cache memory in lieu of an instruction held in the cache memory, and
wherein the lock control unit stops updating of the instruction in the cache memory when the counter is below a prescribed value and when the address of the instruction read from one of the main memory and the cache memory coincides with the address held in the register.

18. The semiconductor device according to claim 13, wherein the cache control unit comprises:
a counter;
a register; and
a lock control unit operable to increment the counter whenever an instruction is read from one of the main memory and the cache memory,
wherein the lock control unit controls the register so as to hold the address of an instruction deleted from the cache memory in lieu of an instruction read from the main memory due to the cache miss, and
wherein the lock control unit stops updating of the instruction in the cache memory when the counter is below a prescribed value and when the address of the instruction read from one of the main memory and the cache memory coincides with the address held in the register.

19. The semiconductor device according to claim 18, wherein the lock control unit updates the data in the register by use of the address of an instruction read from one of the main memory and the cache memory and resets the counter to an initial value, when the value of the counter becomes greater than the prescribed value, before the stop of updating of the instruction in the cache memory.

20. The semiconductor device according to claim 18, wherein the lock control unit resets the counter to an initial value when the updating of the cache memory is stopped,
wherein the lock control unit increments the counter whenever an instruction is read from one of the main memory and the cache memory after the updating is stopped,
wherein the lock control unit resets the counter to an initial value, when the address of the instruction read from one of the main memory and the cache memory coincides with the address held in the register, and
wherein the lock control unit cancels the stop of updating of the cache memory, when the value of the counter is greater than a prescribed value.

* * * * *